US012810177B2

(12) United States Patent
Convolbo

(10) Patent No.: US 12,810,177 B2
(45) Date of Patent: Nov. 24, 2026

(54) PREDICTION SYSTEM, PREDICTION METHOD, AND INFORMATION STORAGE MEDIUM

(71) Applicant: Rakuten Group, Inc., Tokyo (JP)

(72) Inventor: Wendkuuni Moise Convolbo, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 1194 days.

(21) Appl. No.: 17/113,756

(22) Filed: Dec. 7, 2020

(65) Prior Publication Data

US 2021/0201177 A1 Jul. 1, 2021

(30) Foreign Application Priority Data

Dec. 26, 2019 (JP) ................................ 2019-236792

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC ...... G06N 5/04; G06N 20/00; G06Q 30/0207; G06Q 10/02; G06Q 30/0222
See application file for complete search history.

(56) References Cited

U.S. PATENT DOCUMENTS 9,947,022 B1 * 4/2018 Shariff ............. G06Q 10/06311
10,210,548 B1 * 2/2019 Wai .................... G06Q 30/0269
11,037,195 B1 * 6/2021 Puri .................... G06Q 30/0255
2007/0250468 A1 * 10/2007 Pieper ................. G06F 16/9535
2008/0091482 A1 * 4/2008 Whitsett ................ G06Q 10/02 705/6
2012/0005058 A1 * 1/2012 Buck ................... G06F 3/04842 705/37
2014/0156566 A1 * 6/2014 Kabiljo .................. G06N 20/00 706/12

(Continued)

FOREIGN PATENT DOCUMENTS

JP 2003-77067 A 3/2003
JP 2003077067 A * 3/2003

(Continued)

OTHER PUBLICATIONS

Wikipedia entry on "k-nearest neighbors algorithm" edited Dec. 28, 2018, at 03:19 (UTC) (https://en.wikipedia.org/w/index.php?title=K-nearest_neighbors_algorithm&oldid=875654550) (Year: 2018).*

(Continued)

*Primary Examiner* — Tewodros E Mengistu
(74) *Attorney, Agent, or Firm* — Sughrue Mion, PLLC

(57) ABSTRACT

Provided is a prediction system including: a learning model in which a relationship between an action history of each of a plurality of users who used a service in the past and a usage result of the service included in the action history of each of the plurality of users is learned; and at least one processor, the at least one processor being configured to: acquire the action history of a user using the service; predict, based on the action history of the user using the service and the learning model, the usage result of the user using the service; and execute processing corresponding to the usage result predicted.

8 Claims, 14 Drawing Sheets

(56) References Cited

U.S. PATENT DOCUMENTS

| | | | | |
|---|---|---|---|---|
| 2014/0222503 | A1* | 8/2014 | Vijayaraghavan | G06Q 30/0201 705/7.29 |
| 2015/0051963 | A1 | 2/2015 | Matsuda | |
| 2017/0068982 | A1* | 3/2017 | Vangala | G06Q 30/0224 |
| 2021/0034996 | A1* | 2/2021 | Imai | G06N 20/00 |
| 2022/0051282 | A1* | 2/2022 | Morin | G06Q 30/0202 |

FOREIGN PATENT DOCUMENTS

| | | | | | |
|---|---|---|---|---|---|
| JP | 2013-3861 | A | | 1/2013 | |
| JP | 2013003861 | A | * | 1/2013 | |
| JP | 2013-200771 | A | | 10/2013 | |
| JP | 2016-1422 | A | | 1/2016 | |
| JP | 2016001422 | A | * | 1/2016 | G06Q 30/02 |
| JP | 2016-42297 | A | | 3/2016 | |
| JP | 2016042297 | A | * | 3/2016 | |
| JP | 2019-88456 | A | | 6/2019 | |
| JP | 2019088456 | A | * | 6/2019 | |

OTHER PUBLICATIONS

Office Action issued Oct. 17, 2023 in Japanese Application No. 2019-236792.

* cited by examiner

USER U1:A(a1,a2,a3,a4)→B(b1,b2,b3,b4)→C(c1,c2,c3)→D(d1,d2,d3,d4,d5,d6)→E(e1,e2)→F(f1,f2)→G(g1)(Converted)
USER U2:D(d1,d4,d3,d4,d4,d6)→E(e1,e2)→F(f1,f2)→G(g1)(Converted)
USER U3:A(a1,a2,a3,a4)→(b1,b2,b3,b4)→C(c1,c2,c3)→A(a1,a2,a3) →A(a1,a2,a3)(No intention)
USER U4:C(c1,c3)→C(c1,c3)→C(c1,c2,c2,c3)→D(d1,d6)→E(e1,e2)→F(f1)(Abandoned)

FIG.7

DB1

| USER ID | USER NAME | PASSWORD | SESSION ID | SESSION START TIME | ACTION HISTORY DURING SESSION | | | PREDICTION RESULT | COUPON INFORMATION |
|---|---|---|---|---|---|---|---|---|---|
| | | | | | BROWSING HISTORY | INPUT HISTORY | TIME | | |
| u00001 | U1 | ****** | s00001 | 2019/11/30 15:02:40 | URL1 | a1:LOAD | 2019/11/30 15:02:45 | C:17% A:28% N:10% | – |
| | | | | | | a2:Clk_cal | 2019/11/30 15:02:59 | | |
| | | | | | | a3:Chk_wkd | 2019/11/30 15:03:15 | | |
| | | | | | | a4:Clk_submit | 2019/11/30 15:03:31 | | |
| | | | | | URL2 | b1:LOAD | 2019/11/30 15:03:33 | C:42% A:21% N:17% | |
| | | | | | | b2:Clk_Loc | 2019/11/30 15:03:38 | | |
| | | | | | | b3:Chng_Loc | 2019/11/30 15:03:45 | | |
| | | | | | | b4:Clk_srchBtn | 2019/11/30 15:03:57 | | |
| | | | | | ... | ... | ... | ... | |
| u00002 | U2 | ********* | s00002 | 2019/11/30 15:05:8 | URL4 | d1:LOAD | 2019/11/30 15:05:12 | C:31% A:17% N:25% | – |
| | | | | | | d4:Clk_cal | 2019/11/30 15:05:16 | | |
| | | | | | | d3:Chk_wkd | 2019/11/30 15:05:25 | | |
| | | | | | | d4:Clk_cal | 2019/11/30 15:05:32 | | |
| | | | | | | d4:Clk_cal | 2019/11/30 15:05:41 | | |
| | | | | | | d6:Clk_submit | 2019/11/30 15:05:52 | | |
| | | | | | URL5 | e1:LOAD | 2019/11/30 15:03:33 | C:52% A:8% N:11% | |
| | | | | | | e2:Clk_btn_next1 | 2019/11/30 15:03:38 | | |
| | | | | | ... | ... | ... | ... | |
| ... | ... | ... | ... | ... | ... | ... | ... | ... | ... |

FIG.8

DB2

| ACTION HISTORY ID | ACTION HISTORY | | | | LABEL |
|---|---|---|---|---|---|
| | USER ID | BROWSING HISTORY | INPUT HISTORY | TIME | |
| a00001 | u00001 | URL1 | a1:LOAD | 2019/11/30 15:02:45 | C |
| | | | a2:Clk_cal | 2019/11/30 15:02:59 | |
| | | | a3:Chk_wkd | 2019/11/30 15:03:15 | |
| | | | a4:Clk_submit | 2019/11/30 15:03:31 | |
| | | URL2 | b1:LOAD | 2019/11/30 15:03:33 | |
| | | | b2:Clk_Loc | 2019/11/30 15:03:38 | |
| | | | b3:Chng_Loc | 2019/11/30 15:03:45 | |
| | | | b4:Clk_srchBtn | 2019/11/30 15:03:57 | |
| | | ⋮ | ⋮ | ⋮ | |
| a00002 | u00002 | URL4 | d1:LOAD | 2019/11/30 15:05:12 | C |
| | | | d4:Clk_cal | 2019/11/30 15:05:16 | |
| | | | d3:Chk_wkd | 2019/11/30 15:05:25 | |
| | | | d4:Clk_cal | 2019/11/30 15:05:32 | |
| | | | d4:Clk_cal | 2019/11/30 15:05:41 | |
| | | | d6:Clk_submit | 2019/11/30 15:05:52 | |
| | | URL5 | e1:LOAD | 2019/11/30 15:03:33 | |
| | | | e2:Clk_btn_next1 | 2019/11/30 15:03:38 | |
| | | ⋮ | ⋮ | ⋮ | |
| ⋮ | ⋮ | ⋮ | ⋮ | ⋮ | ⋮ |

FIG.9

DB3

| PAGE | ATTRIBUTE |
|---|---|
| URL1 | NO INTENTION |
| URL2 | NO INTENTION |
| URL3 | NO INTENTION |
| URL4 | NO INTENTION |
| URL5 | HAS INTENTION |
| URL6 | HAS INTENTION |
| URL7 | CONVERSION |
| ⋮ | ⋮ |

FIG.10

DSn

| FEATURE AMOUNT OF ACTION HISTORY | LABEL |
|---|---|
| (x1,y1,z1,...) | C |
| (x2,y2,z2,...) | C |
| (x3,y3,z3,...) | N |
| (x4,y4,z4,...) | A |
| ⋮ | ⋮ |

| No | ACTION HISTORY | DISTANCE | WEIGHTING COEFFICIENT |
|---|---|---|---|
| 1 | ▲ | 2 | 1 |
| 2 | ▲ | 3 | 0.88 |
| 3 | ▲ | 3.5 | 0.82 |
| 4 | ■ | 6 | 0.52 |
| 5 | ■ | 7 | 0.41 |
| 6 | ■ | 8 | 0.29 |
| 7 | ■ | 9 | 0.17 |
| 8 | ■ | 10 | 0.05 |
| 9 | ● | 10.5 | 0 |

| CONVERSION RESULT | VOTES |
|---|---|
| ▲ | 2.7 |
| ■ | 1.45 |
| ● | 0 |

PREDICTION SYSTEM, PREDICTION METHOD, AND INFORMATION STORAGE MEDIUM

CROSS-REFERENCE TO RELATED APPLICATION

The present application claims priority from Japanese application JP 2019-236792 filed on Dec. 26, 2019, the content of which is hereby incorporated by reference into the application.

BACKGROUND OF THE INVENTION

1. Field of the Invention

The present disclosure relates to a prediction system a prediction method, and an information storage medium.

2. Description of the Related Art

Technologies for analyzing an action of a user using a service are known. For example, in JP 2013-200771 A, there is described a system configured to predict that when a predetermined operation, for example, bookmarking a web page, is performed, the user is more interested and there is a higher conversion probability than when the web page is simply displayed, and to confer a benefit relating to the bookmarked web page.

SUMMARY OF THE INVENTION

However, in the technology of JP 2013-200771 A1, there is a large variety of user actions, and hence it is difficult to comprehensively set operations predicted to have a high conversion probability, and a sufficient prediction accuracy is thus not obtainable. Further, in the technology of the JP 2013-200771 A1, the benefit is not conferred until the user performs a predetermined operation, and therefore real-time performance is also poor.

An object of the present disclosure is to increase prediction accuracy and real-time performance.

According to at least one aspect of the present disclosure, there is provided a prediction system including: a learning model in which a relationship between an action history of each of a plurality of users who used a service in the past and a usage result of the service included in the action history of each of the plurality of users is learned; and at least one processor, the at least one processor being configured to: acquire the action history of a user using the service; predict, based on the action history of the user using the service and the learning model, the usage result of the user using the service; and execute processing corresponding to the usage result predicted.

According to at least one aspect of the present disclosure, there is provided a prediction method executed by at least one processor, including: acquiring an action history of a user using a service; predicting a usage result of the user using the service based on the action history of the user using the service and a learning model in which a relationship between an action history of each of a plurality of users who used a service in the past and a usage result of the service included in the action history of each of the plurality of users is learned; and executing processing corresponding to the usage result predicted.

According to at least one aspect of the present disclosure, there is provided a non-transitory information storage medium having stored thereon a program for causing a computer to: acquire an action history of a user using a service; predict a usage result of the user using the service based on the action history of the user using the service and a learning model in which a relationship between an action history of each of a plurality of users who used a service in the past and a usage result of the service included in the action history of each of the plurality of users is learned; and execute processing corresponding to the usage result predicted.

BRIEF DESCRIPTION OF THE DRAWINGS

FIG. 7 is a table for showing a data storage example of a user database.

FIG. 8 is a table for showing a data storage example of an action history database.

FIG. 9 is a table for showing a data storage example of domain knowledge data.

FIG. 10 is a table for showing a data storage example of a teacher data set.

DETAILED DESCRIPTION OF THE INVENTION

1. Overall Configuration of Prediction System

Figure 1:
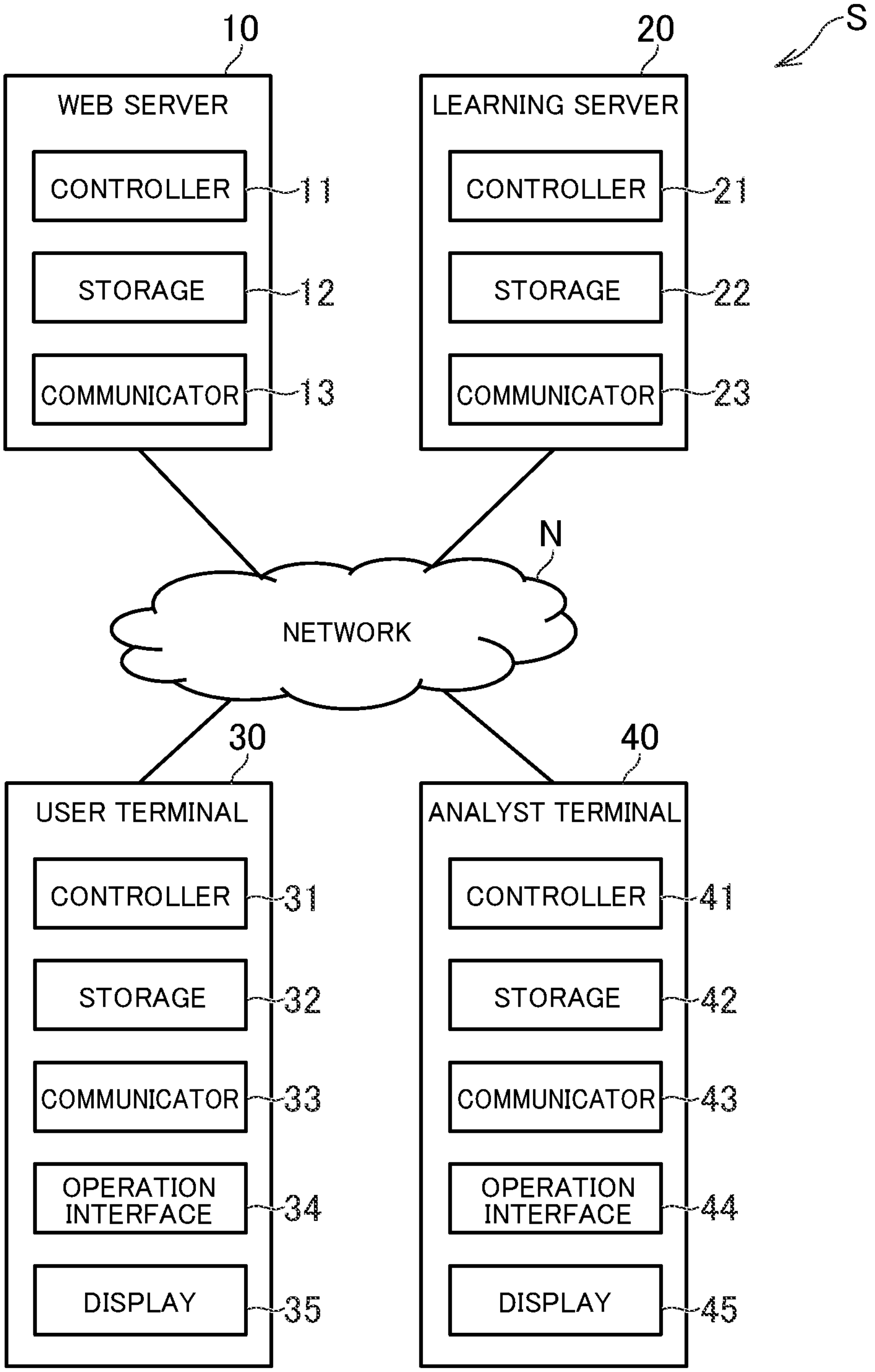
FIG. 1 is a diagram for illustrating an overall configuration of a prediction system according to at least one aspect of the present disclosure.

Description is now given of an example of an embodiment of a prediction system according to at least one aspect of the present disclosure. FIG. 1 is a diagram for illustrating an overall configuration of the prediction system. As illustrated in FIG. 1, a prediction system S includes a web server 10, a learning server 20, a user terminal 30, and an analyst terminal 40. Each of those components is connected to a network N, for example, the Internet. In FIG. 1, there is illustrated one web server 10, one learning server 20, one user terminal 30, and one analyst terminal 40, but there may be a plurality of those components.

The web server 10 is a server computer configured to manage a website. In this embodiment, each screen included on the website is referred to as "page," and a set of a plurality of those pages is referred to as "website." For example, the web server 10 includes a controller 11, a storage 12, and a communicator 13.

The controller 11 includes at least one processor. The controller 11 is configured to execute processing in accordance with a program and data stored in the storage 12. The storage 12 includes a main memory and an auxiliary storage. For example, the main memory is a volatile memory, for example, a RAM, and the auxiliary storage is a non-volatile memory such as a hard disk drive or a flash memory. The communicator 13 includes a communication interface for wired communication or wireless communication, and communicates data via the network N, for example.

The learning server 20 is a server computer configured to analyze user actions. For example, the learning server 20 includes a controller 21, a storage 22, and a communicator 23. A hardware configuration of each of the controller 21, the storage 22, and the communicator 23 may be the same as that of the controller 11, the storage 12, and the communicator 13, respectively.

The user terminal 30 is a computer to be operated by the user. For example, the user terminal 30 is a personal computer, a portable information terminal (including a tablet computer), or a cellular phone (including a smartphone). The user is a person using a service provided by the web server 10. For example, the user is a person browsing a website. The user can also be referred to as "end user."

The user terminal 30 includes a controller 31, a storage 32, a communicator 33, an operation interface 34, and a display 35. A hardware configuration of each of the controller 31, the storage 32, and the communicator 33 may be the same as that of the controller 11, the storage 12, and the communicator 13, respectively. The operation interface 34 is an input device for operation by the user, and is, for example, a pointing device such as a touch panel or a mouse, or a keyboard. The operation interface 34 is configured to transmit operation content of the user to the controller 31. The display 35 is, for example, a liquid crystal display or an organic EL display.

The analyst terminal 40 is a computer to be operated by an analyst. For example, the analyst terminal 40 is a personal computer, a portable information terminal, or a cellular phone. The analyst is a person in charge of analyzing the actions of the users. For example, the analyst is a data scientist at a company providing the service.

The analyst terminal 40 includes a controller 41, a storage 42, a communicator 43, an operation interface 44, and a display 45. A hardware configuration of each of the controller 41, the storage 42, the communicator 43, the operation interface 44, and the display 45 may be the same as that of the controller 11, the storage 12, the communicator 13, the operation interface 34, and the display 35, respectively.

The programs and data described as being stored in the storages 12, 22, 32, and 42 may be supplied to through the network N. Moreover, the hardware configuration of each of the web server 10, the learning server 20, the user terminal 30, and the analyst terminal 40 is not limited to the above-mentioned examples, and various types of hardware can be applied. For example, the web server 10, the learning server 20, the user terminal 30, and the analyst terminal 40 may each include a reader (for example, optical disc drive or memory card slot) configured to read a computer-readable information storage medium and an input/output device (for example, USB terminal) for directly connecting to an external device. In this case, programs and data stored in the information storage medium may be supplied through the reader or the input/output device.

2. Outline of Prediction System

The prediction system S of this embodiment is configured to analyze the actions of the users using the service based on a learning model in which a relationship between an action history of each of a plurality of users who used the service in the past and a usage result of the service included in each action history is learned.

The service may be any kind of service provided by using electronic or physical means. In this embodiment, a golf course reservation service is described as an example of the service. However, for example, the prediction system S is also applicable to a travel reservation service for accommodation facilities and air tickets, a product purchasing service for an online shopping mall, a sales agency service for lottery tickets and betting tickets, a content providing service for moving images or games, a financial service, or an insurance service.

The action history is the history of actions completed in the past. The term "action" refers to a behavior of the user exhibited when the user uses the service, and can also be referred to as a log of the processing executed by the user terminal 30. The action history shows at least one action. The action history may show only one action, or each of a plurality of actions in time series. For example, in the case of a service using a website, the action history shows at least one of a browsing history of the user and an input history of the user on each page. As used herein, the term "browsing" refers to a page being displayed on the display 35 or that the displayed page is viewed. The term "input" refers to an operation received by the operation interface 34 while the page is displayed. Examples of the input include focusing on an input form, inputting information to an input form, scrolling a page, and selecting a button.

The "usage result" of the service is the result obtained by the user using the service. In other words, the usage result of a service is how the service is used. For example, the usage result of a service is whether or not a predetermined result has been obtained in the service. The predetermined result may be a result determined in order to analyze the actions of the user, and may indicate, for example, whether or not conversion has been achieved. The usage result of the service is not limited to conversion, and may be set in accordance with the purpose of action analysis. For example, when the prediction system S is used for fraud detection, the usage result of the service may indicate whether or not fraud has been performed.

As used herein, the term "conversion" refers to achieving the purpose of the service. When the purpose of the service is to reserve a facility, completion of the reservation or completion of payment means that conversion has been achieved. When the purpose of the service is to sell a product, completion of the purchase or completion of payment means that conversion has been achieved. For example, in the case of a golf course reservation service, completion of the golf course reservation means that conversion has been achieved. For a travel reservation service, completion of the reservation of an accommodation facility or an airline ticket, for example, means that conversion has been achieved. For a product purchasing service, completion of the purchase of the product means that conversion has been achieved. The same applies to other services, and when the purpose of the service is achieved, this means that conversion has been achieved.

In this embodiment, as examples of the usage result of the service, there are described "conversion" indicating that conversion has been achieved, "abandoned" indicating that there was a conversion intention, but in the end, conversion was not achieved, and "no intention" indicating that there was no conversion intention. Each action history is classified (labeled) into any one of those three types of usage results. The method of classifying the action history is described later.

A learning model is a model that uses machine learning. The learning model may also be referred to as AI (artificial intelligence), a classifier, or a classification learning device. For the machine learning itself, various known methods can be used. Examples of methods that can be used include a neural network, reinforcement learning, and deep learning. For the machine learning, any one of supervised learning, semi-supervised learning, and unsupervised machine learning may be used.

The term "user using the service" refers to a user who is currently using the service. In the case of a service using a website as in the case of this embodiment, a user connected to the website (user who is online with respect to the service) corresponds to a "user using the service." For example, a user that has established a session between the web server 10 and the user terminal 30 corresponds to a "user using the service." As another example, a user for whom a predetermined time has not elapsed since his or her latest operation or access also corresponds to a "user using the service." Further, for example, a logged-in user corresponds to a "user using the service."

For example, the prediction system S analyzes the action history of a user using the service and predicts in real time whether or not the user converts. The web server 10 displays a website for receiving a golf course reservation on the user terminal 30, and the user searches for a desired golf course page and completes the reservation.

Figure 2:
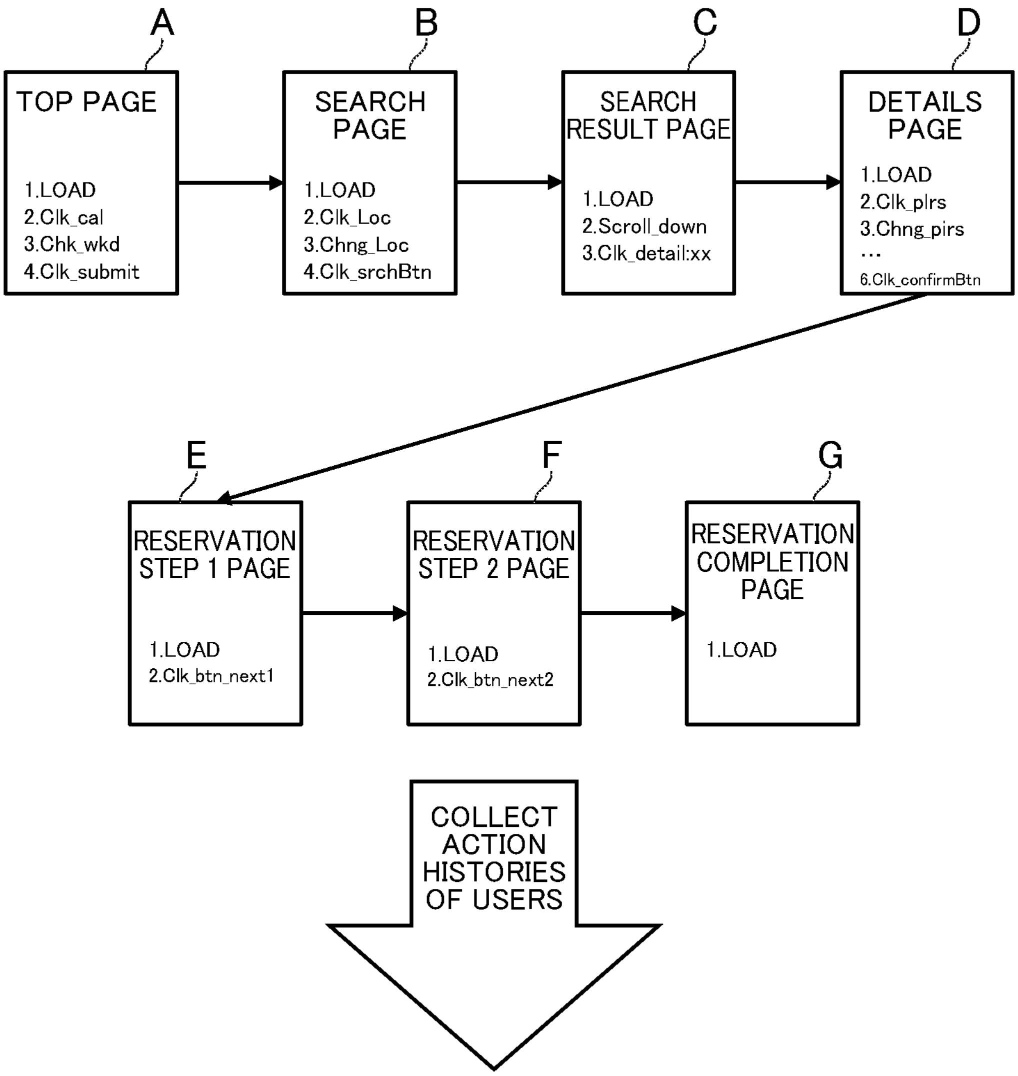
FIG. 2 is a diagram for illustrating a configuration example of a website provided by a web server.

FIG. 2 is a diagram for illustrating a configuration example of a website provided by the web server 10. In this embodiment, as illustrated in FIG. 2, for example, when the screens transitions to, in order, a top page A, a search page B, a search result page C, a details page D, a reservation step 1 page E, a reservation step 2 page F, and a reservation completion page G, the golf course reservation is completed.

The top page A is the topmost page that serves as a portal to the service. In a case where the website has a tree structure (hierarchical structure), the top page A corresponds to a root node. The search page B is a page for inputting a search condition (query) for the golf course. On the search page B, an input form for inputting a search condition, for example, a golf course area, a play start date and time, or the number of players, is displayed.

The search result page C is a page displaying a list of the golf courses retrieved based on the search condition. The details page D is a page showing the details of the course at the golf course. For example, the details page D of the golf course selected from the search result page C is displayed. In the example of FIG. 2, only one details page D is illustrated, but the number of details pages D is equal to the number of courses for which the web server 10 can receive a reservation. Therefore, when the user does not like the golf course of the displayed details page D, the user can return to the search result page C and display the details page D of another golf course.

The reservation step 1 page E and the reservation step 2 page F are each a page for inputting information required for reservation of a golf course. For example, the reservation step 1 page E displays input forms for inputting, for example, the play start time and the number of players. Further, for example, the reservation step 2 page F displays input forms for inputting the name, address, telephone number, and email address of the person making the reservation, and the name(s) of other player(s), for example.

In this embodiment, it is not possible to advance to the reservation step 2 page F unless all of the input forms on the reservation step 1 page E have been filled in. For example, in a case where there is information yet to be input on the reservation step 1 page E, even when the button for advancing to the reservation step 2 page F is selected, it is not possible to advance to the reservation step 2 page F. In this case, the reservation step 1 page E is displayed again, and an error message indicating that information remains to be input is displayed at a predetermined position.

The reservation completion page G is a page showing that the golf course reservation has been completed. In this embodiment, it is not possible to advance to the reservation completion page G unless all of the input forms of the reservation step 2 page F have been filled in. Therefore, as in the case of the reservation step 1 page F, when there is information yet to be input on the reservation step 2 page F, it is not possible to advance to the reservation completion page G, and an error message is displayed.

The user is not required to perform the screen transitions in the order described above, and can perform the screen transitions in any order. For example, the user can display the search result page C from the beginning via an external search site. As another example, when the user has bookmarked a link to the details page D, the details page D may be displayed from the beginning without the top page A, the search page B, and the search result page C being displayed. Further, for example, the user can go back and forth between the search result page C and the details page D to find a desired golf course, or can return to the top page A from the reservation completion page G.

In this embodiment, the web server 10 collects and accumulates the action histories of a large number of users who have used the service in the past. In FIG. 2, the action histories of four users U1 to U4 are illustrated. The pages browsed by the user are shown in uppercase letters, and the input of the user on each page is illustrated in lowercase letters.

For example, the action history of the user U1 shows that inputs a1 to a4 were performed on the top page A, inputs b1 to b4 were performed on the search page B, inputs c1 to c3 were performed on the search result page C, inputs d1 to d6 were performed on the details page D, inputs e1 and e2 were performed on the reservation step 1 page E, inputs f1 and f2 were performed on the reservation step 2 page F, and an input g1 was performed on the reservation completion page G. The action history of the user U1 is classified as "conversion" because the user reached the reservation completion page G, and a golf course reservation has been completed.

Further, for example, the action history of the user U2 shows that the inputs d1 to d6 were performed on the details page D, the inputs e1 and e2 were performed on the reservation step 1 page E, the inputs f1 and f2 were performed on the reservation step 2 page F, and the input g1 was performed on the reservation completion page G. The user U2 has bookmarked a link to the details page D, and the details page D is displayed from the beginning. The action history of the user U2 is classified as "conversion" because the user reached the reservation completion page G, and a golf course reservation has been completed.

Further, for example, the action history of the user U3 shows that the inputs a1 to a4 were performed on the top page A, the inputs b1 to b4 were performed on the search page B, the inputs c1 to c3 were performed on the search result page C, the user returned to the top page A and performed the inputs a1 to a3, and the inputs a1 to a3 were again performed on the top page A. The action history of the user U3 is classified as "no intention" because the user U3 left without reaching the reservation step 1 page E, and it is predicted that the user was only browsing golf courses without an intention of making a reservation.

Further, for example, the action history of the user U4 shows that the search result page C was displayed first, and then after several attempts to transition to the details page D that were not successful due to factors, for example, an input error, the inputs d1 and d6 were performed on the details page D, the inputs e1 and e2 were performed on the reservation step 1 page E, the input f1 was performed on the reservation step 2 page F, and then the user left. The action history of the user U4 is classified as "abandoned" because the reservation step 1 page E and the reservation step 2 page F were displayed, but the user did not reach the reservation completion page G despite having an intention to make a reservation.

As described above, the user uses the service while sequentially moving through each page of the website provided by the web server 10. In this embodiment, the learning server 20 is configured to train the learning model based on the action histories accumulated in the web server 10.

Figure 3:
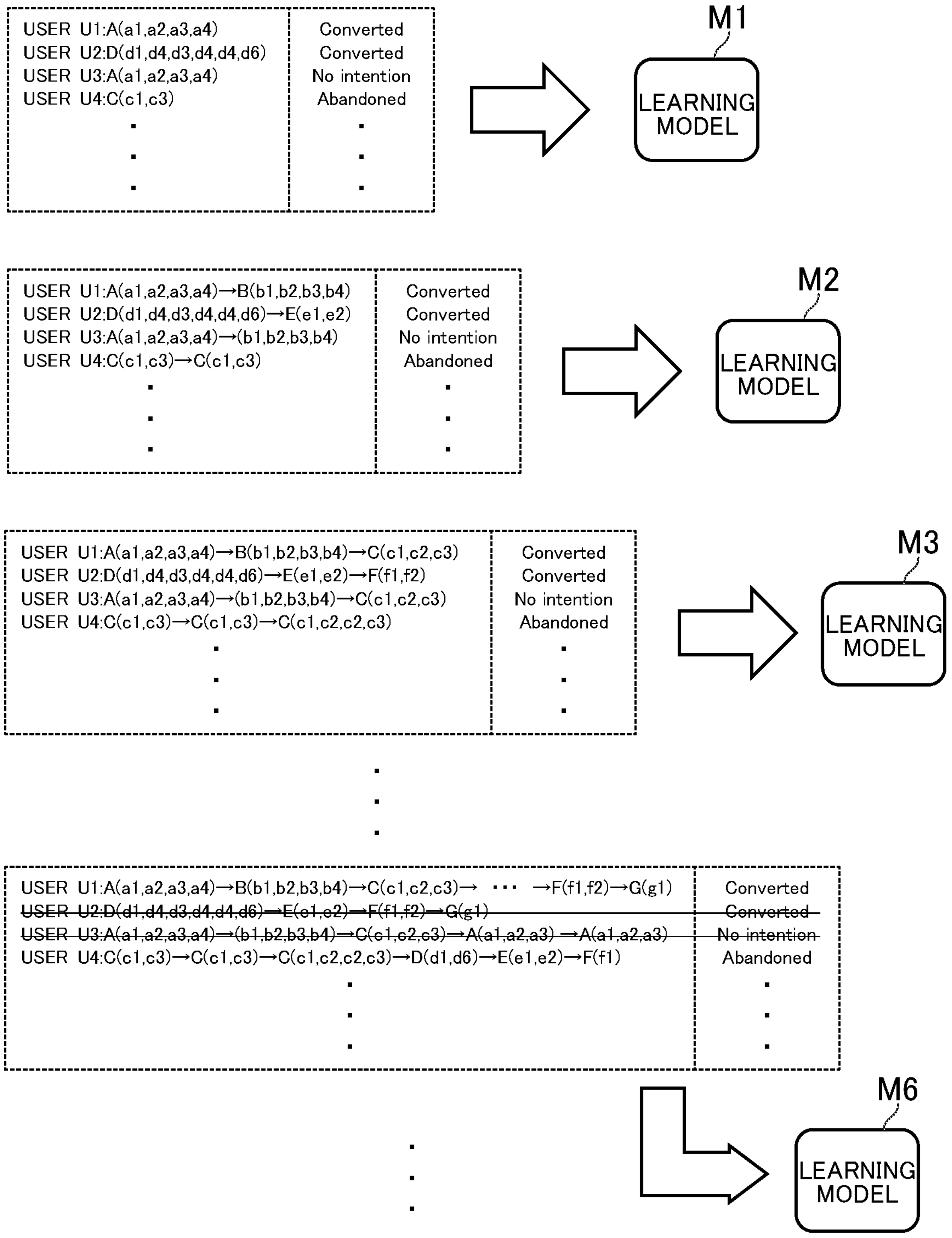
FIG. 3 is a diagram for illustrating an example of a learning method for a learning model.

FIG. 3 is a diagram for illustrating an example of a learning method for the learning model. There may be only one learning model, but in this embodiment, there is described a case in which a plurality of learning models are prepared. As illustrated in FIG. 3, a learning model M1 is a model for predicting the usage result of the service based on the page displayed first by the user using the service. In the learning model M1, the relationship between the first page shown in the past action histories accumulated in the web server 10 and the usage result of the service included in the action histories is learned. The second and subsequent pages are not learned by the learning model M1.

A learning model M2 is a model for predicting the usage result of the service based on the pages displayed first and second by the user using the service. In the learning model M2, the relationship between the first and second pages shown in the past action histories accumulated in the web server 10 and the usage result of the service included in the action histories is learned. The third and subsequent pages are not learned by the learning model M2.

The same applies to the subsequent learning model Mp (p is an integer of 3 or more). The learning model Mp is a model for predicting the usage result of the service based on the first to the p-th pages displayed by the user using the service. In the learning model Mp, the relationship up to the p-th page shown in the action histories accumulated in the web server 10 and the usage result of the service is learned. In the following description, when the individual learning models are not distinguished, the learning models are referred to as "learning model Mn," in which "n" is a natural number of 1 or more. Any value can be set as a maximum value of n. The "maximum value of n" means the total number of learning models Mn. For example, when pages up to the 20th page displayed by the user using the service are to be traced and analyzed, n is 20, and 20 learning models Mn are prepared.

Figure 4:
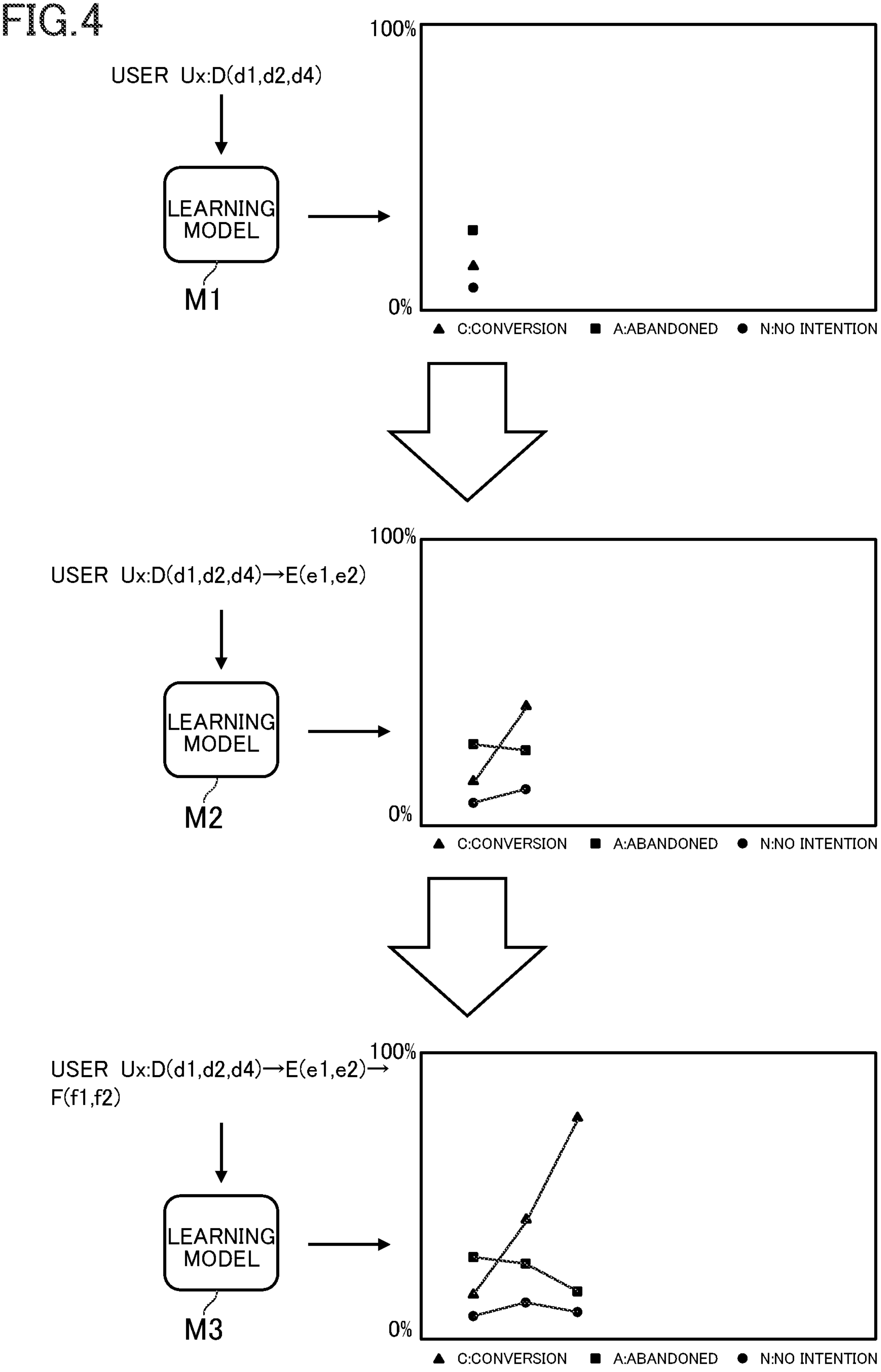
FIG. 4 is a diagram for illustrating an example of how a usage result of a service is predicted in real time based on action histories of users using the service.
Figure 5:
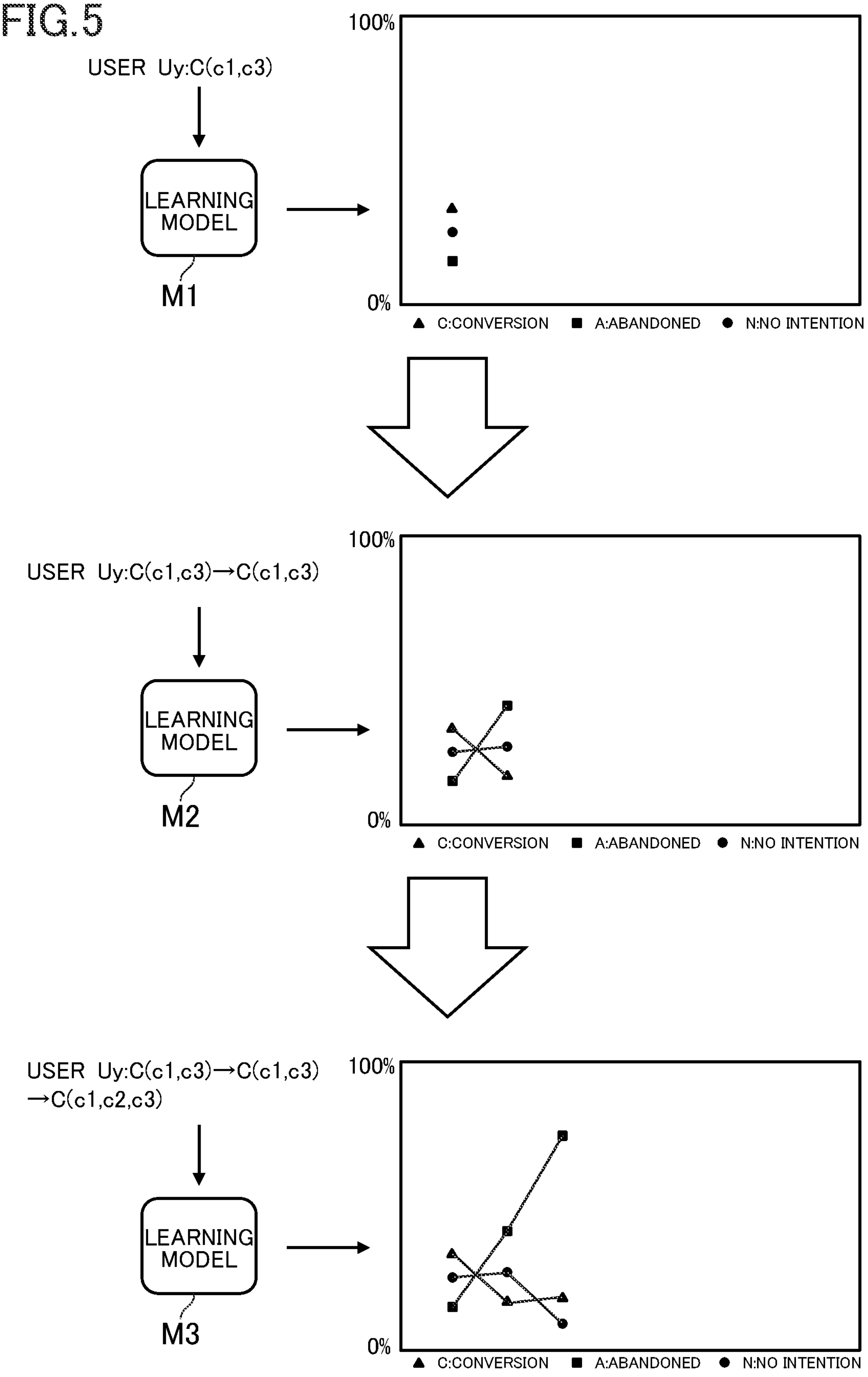
FIG. 5 is a diagram for illustrating an example of how the usage result of the service is predicted in real time based on the action histories of the users using the service.

FIG. 4 and FIG. 5 are diagrams for illustrating an example of how the usage result of the service is predicted in real time based on the action history of the user using the service. In FIG. 4 and FIG. 5, a black triangle indicates a probability of being classified as "conversion," a black square indicates the probability of being classified as "abandoned," and a black circle indicates the probability of being classified as "no intention." In this embodiment, the label indicating "conversion" is written as "C," the label indicating "abandoned" is written as "A," and the label indicating "no intention" is written as "N."

As illustrated in FIG. 4, for example, a user Ux accesses the web server 10, displays the details page D, and enters the inputs d1, d2, and d4 to the details page D. The web server 10 transmits the content of the first action (content input to details page D) of the user Ux to the learning server 20 and requests analysis. The learning server 20 inputs the content of the first action of the user Ux to the learning model M1.

The learning model M1 calculates the probability of each of "conversion," "abandoned," and "no intention" based on the content of the first action of the user Ux. As used herein, the term "probability" can also be referred to as the certainty (chance) of classification. As illustrated in FIG. 4, the learning model M1 is a model for predicting the usage result of the service based only on the content of the first action, and the amount of information included in the action history of each user is not large, and hence the probability of any of the classifications is not so high.

Next, the user Ux displays the reservation step 1 page E and inputs the information required for the reservation. The web server 10 transmits the content up to the second action (content input to each of details page D and reservation step 1 page E) of the user Ux to the learning server 20 and requests analysis. The learning server 20 inputs the content up to the second action of the user Ux to the learning model M2. The learning model M2 calculates the probability of each of "conversion," "abandoned," and "no intention" based on the content up to the second action of the user Ux. As illustrated in FIG. 4, the probability of each of those classifications changes.

Next, the user Ux displays the reservation step 2 page F and inputs the information required for the reservation. The web server 10 transmits the content up to the third action (content input to each of details page D, reservation step 1 page E, and reservation step 2 page F) of the user Ux to the learning server 20 and cause the learning server 20 to execute analysis. The learning server 20 inputs the content up to the third action of the user Ux to the learning model M3. The learning model M3 calculates the probability of each of "conversion," "abandoned," and "no intention" based on the content up to the third action of the user Ux.

Subsequently, the learning model Mn calculates, until the user Ux session is disconnected or conversion is completed, the probability of each of "conversion," "abandoned," and "no intention" each time a new page is displayed. As illustrated in FIG. 4, for the user Ux, there is a very high probability of "conversion" when the third page is displayed, and as it stands, there is a very high probability that the user Ux completes the golf course reservation, and hence the web server 10 does nothing with respect to the user Ux.

In contrast, as illustrated in FIG. 5, for a user Uy, there is a very high probability of "abandoned" when the third page is displayed. This means that there is a high probability of the user Uy subsequently leaving the website. Therefore, for the user Uy, when the fourth page is displayed, the web server 10 distributes a coupon that can be used for the golf course reservation. As a result, there is a reduced possibility that the user Uy leaves without conversion.

As described above, the prediction system S predicts the usage result of a user using the service based on the action history of the user using the service and the learning model Mn. The prediction system S is configured to increase the prediction accuracy of the usage result and the real-time performance of processing corresponding to the usage result by executing the processing corresponding to the usage result predicted (the predicted usage result). The details of the prediction system S are now described.

3. Functions to be Implemented in this Embodiment

Figure 6:
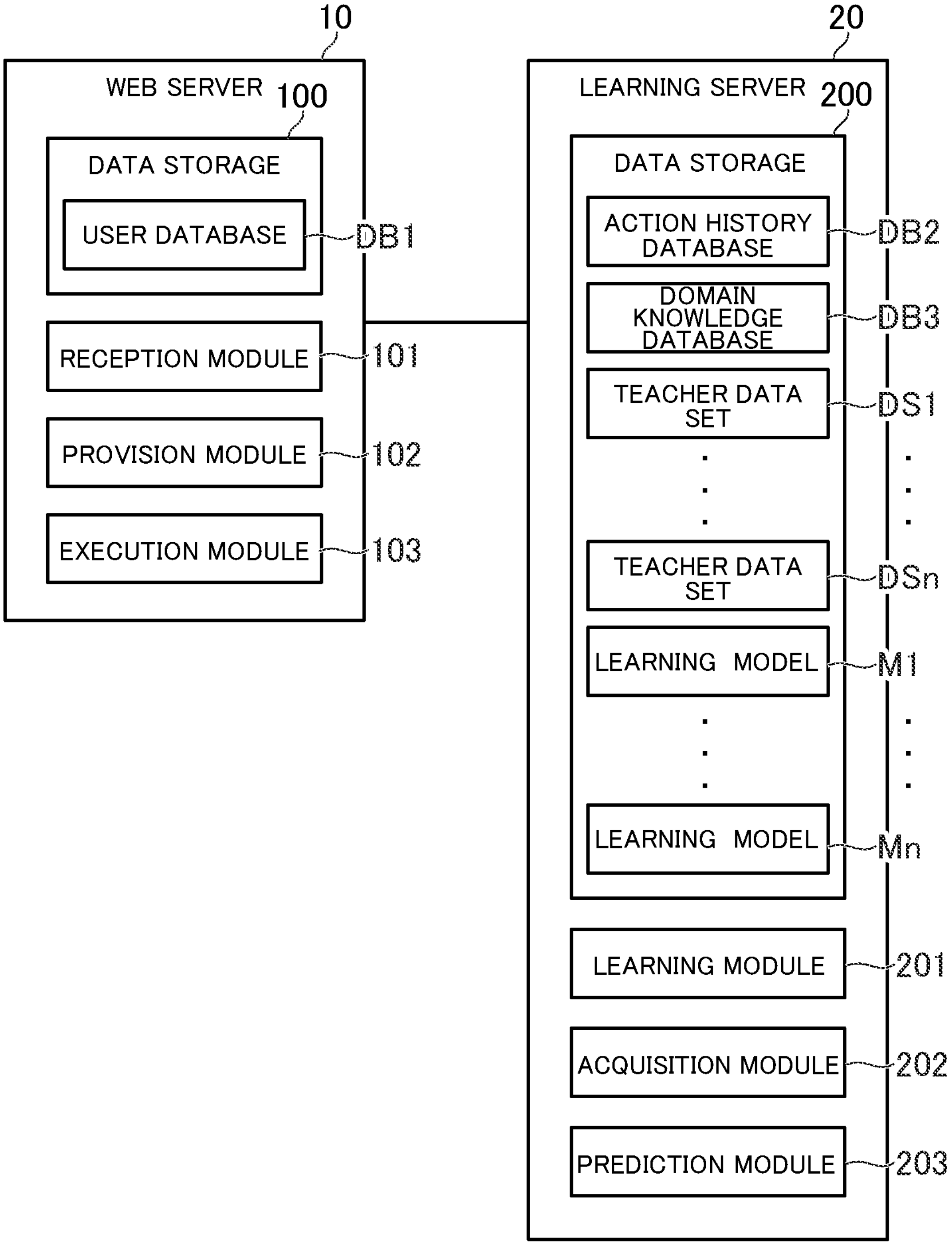
FIG. 6 is a functional block diagram for illustrating an example of functions to be implemented in the prediction system.

FIG. 6 is a functional block diagram for illustrating an example of functions to be implemented in the prediction system S. In this embodiment, functions to be implemented in the web server 10 and the learning server 20 are described.

[3-1. Functions to be Implemented in Web Server]

As illustrated in FIG. 6, in the web server 10, a data storage module 100, a reception module 101, a provision module 102, and an execution module 103 are implemented. The data storage module 100 is mainly implemented by the storage 12, and each of the other functions is mainly implemented by the controller 11.

[Data Storage Module]

The data storage module 100 is configured to store the data required for providing a service to users. For example, the data storage module 100 stores a user database DB1.

FIG. 7 is a table for showing a data storage example of the user database DB1. As shown in FIG. 7, the user database DB1 is a database configured to store information on each of a plurality of users. For example, the user database DB1 stores a user ID, a user name, a password, a session ID, a session start time, an action history during the session, a prediction result history, and coupon information.

The user ID is information for uniquely identifying the user. The user name is the name of the user. The password is authentication information for logging in to the service. The user database DB1 may also store other information registered by the user, for example, information on an address, a date of birth, a gender, a telephone number, and an email address.

The session ID is information for uniquely identifying the session between the web server 10 and the user terminal 30. The session ID is generated when the session is established, and remains valid until the session is disconnected. Any communication protocol method can be used as the method of establishing the session. For example, HTTP, HTTPS, or SSL can be used.

The session start time is the time at which the session is established. When a valid time period for the session is set, the session ID is valid from the session start time until a certain time later.

The action history during the session is the action history from the start of the session until the disconnection of the session (the period during which the session is established). The meaning of "action history" is as described above. The actions of the user are shown in time series. In the example of FIG. 7, as the action history, the content of the action history and the time at which the action is performed are stored. For example, the action history includes at least one of a browsing history by the user and a history of the content input by the user. In this embodiment, there is described a case in which the browsing history and the input content history are both included in the action history, but the action history may include only any one of the browsing history and the input content history.

The browsing history is a time-series change of the pages displayed on the user terminal 30. The term "browsing history" can also be referred to as "screen transitions." The browsing history can also be referred to as a history of the pages displayed on the user terminal 30. In this embodiment, there is described a case in which the pages are identified by a URL, but the screens may be identified based on any information, for example, the page ID. The content input by the user is the input of the user to each page. The inputs by the user can also be referred to as an operation history from the operation interface 34.

The prediction result history is the history of the usage results predicted by a prediction module 203. In this embodiment, the probability of each of "conversion," "abandoned," and "no intention" is calculated as the prediction result, and therefore the prediction result history shows the changes in those probabilities. Further, in this embodiment, a usage result is predicted each time the page displayed on the user terminal 30 changes, and therefore the probability of each label is stored in the prediction result history for each displayed page.

The coupon information is information on a coupon conferred by the execution module 103, which is described later. For example, when a plurality of coupons are prepared, the coupon information indicates the type of coupon conferred to the user. When the coupon has an expiration date, the expiration date may be included in the coupon information. Coupon information is not stored for users to whom a coupon has not been conferred.

For example, when the web server 10 establishes a session with the user terminal 30 of a certain user, the web server 10 stores the session ID and the session start time of the record in which the user ID of the user is stored. The web server 10 stores the URL of the screen each time the screen displayed on the user terminal 30 changes. Further, for example, the web server 10 stores the input content of the user each time an operation, for example, an input, is received from the user terminal 30 to an input form. Moreover, for example, when the web server 10 receives a prediction result from the learning server 20, the web server 10 stores the prediction result in the prediction result history. The coupon information is stored when a coupon has been conferred by the execution module 103.

The data stored in the data storage module 100 is not limited to the examples described above. For example, the data storage module 100 may store the display data of each page on the website. Further, for example, the data storage module 100 may store the type of coupon to be conferred to the user. As another example, the data storage module 100 may store an action history database DB2 and a domain knowledge database DB3, which are described later. Moreover, for example, the data storage module 100 may store a database showing content for which reservation has been completed.

[Reception Module]

The reception module 101 is configured to receive various types of requests from the user terminal 30. The reception module 101 can receive any request from the user terminal 30. For example, the reception module 101 receives an access request and a page display request. Those requests are issued by transmitting data in a predetermined format.

The access request is a request transmitted when a user terminal 30 for which a session has not been established accesses the web server 10. The access request includes, for example, the user ID, the password, and the URL of the page to be accessed. For example, when the reception module 101 receives the access request, predetermined authentication processing is executed. When the authentication is successful, a session is established between the web server 10 and the user terminal 30.

The page display request is a request for displaying a new page. The page display request includes, for example, the URL of the page to be displayed next. Further, for example, the page display request includes the URL of the page currently being displayed and the content input on the page. For example, when the reception module 101 receives the page display request, the URL and the input content included in the page display request are stored together with the current date and time as the action content for the session.

[Provision Module]

The provision module 102 is configured to provide the service to the user. For example, the provision module 102 transmits, when the page display request is received, the display data of the new page to the user terminal 30. Further, for example, when a coupon has been issued by the execution module 103, the provision module 102 transmits display data including, in the new page, information for identifying the issued coupon. Moreover, for example, the provision module 102 executes reservation processing when the user performs a predetermined reservation operation.

[Execution Module]

The execution module 103 is configured to execute processing corresponding to the predicted usage result. For example, the execution module 103 executes the above-mentioned processing before the user using the service leaves. The execution module 103 may execute the above-mentioned processing after the user using the service has left or when it is unknown whether or not the user using the service has left.

As used herein, the term "leave" refers to the user leaving the service, and means that the use of the service has ended. In the case of a service using a website as in this embodiment, "leave" refers to the user leaving the website. For example, disconnecting the session between the web server 10 and the user terminal 30 corresponds to "leave." Further, for example, the absence of an operation or access by the user for a certain period of time corresponds to "leave." As another example, the user performing a predetermined log-out operation corresponds to "leave." Moreover, for example, the user closing the screen corresponds to "leave." The expression "user using the service" has the opposite meaning to a user who has left. In this embodiment, the "user using the service" refers to a user who is online with respect to the service, and the "user who has left" refers to a user who is offline with respect to the service.

The processing corresponding to the predicted usage result is processing in which whether or not to execute the processing is determined based on the predicted usage result, or processing in which the content changes based on the predicted usage result. In this embodiment, as an example of the processing, there is described processing of conferring a coupon to a user. The coupon may be anything relating to the service, for example, a right to receive a discount when the service is used, a right to receive points when the service is used, or a right to receive content or a good when the service is used. The processing executed by the execution module 103 may any processing, for example, processing of restricting use of the service, processing of supporting use of the service, or processing of conferring a privilege other than a coupon. The privilege is a benefit to be given to the user. The privilege may be any content other than the coupon, and may be, for example, the conferral of points or a gift of a product or a service.

In this embodiment, the presence or absence of conversion is predicted as the usage result, and therefore the execution module 103 executes the processing corresponding to the predicted presence or absence of conversion. For example, as the above-mentioned processing, the execution module 103 confers a coupon or points relating to the service to the user using the service when it is predicted that the service is not to be converted by the user using the service. The execution module 103 does not confer a coupon or points when it is predicted that the service is to be converted. In this embodiment, there is described a case in which a coupon is conferred, but the same processing is executed also in the case of conferring points.

For example, the learning model Mn outputs the probability of the predicted usage result (in this embodiment, the probability of each of "conversion," "abandoned," and "no intention"), and therefore the execution module 103 executes the processing corresponding to the probability of the predicted usage result. The execution module 103 does not confer a coupon to a user having an "abandoned" probability that is less than a threshold value, and confers a coupon to a user having an "abandoned" probability that is equal to or more than the threshold value. The threshold value may be a fixed value or a variable value. The threshold value may be set for each user. Further, for example, when a plurality of types of coupons are prepared, the execution module 103 may change the coupon to be conferred based on how high the "abandoned" probability is. For example, the execution module 103 confers a more valuable coupon when the probability is higher. In this case, the coupons are ranked based on their probabilities. Moreover, for example, in place of using a threshold value, the execution module 103 may confer a coupon when the "abandoned" probability is the highest.

The execution module 103 may execute the above-mentioned processing when the predicted latest usage result has changed from the usage result predicted in the past. For example, the execution module 103 executes the processing on condition that there has been a predetermined change in the usage result. Further, for example, the execution module 103 changes the processing content in accordance with the change in the usage result. For example, the execution module 103 confers a coupon when there has been a change from a state in which the "conversion" probability is the highest to a state in which the "abandoned" probability is the highest. Moreover, for example, the execution module 103 confers a coupon when an amount of decrease in the "conversion" probability is equal to or more than a threshold value, or when an amount of increase in the "abandoned" probability is equal to or more than a threshold value.

In this embodiment, there is described a case in which the learning model Mn outputs the probability, but the learning model Mn may be configured to execute only classification (labeling), and not to output the probability. In this case, the learning model Mn outputs a label of any one of "conversion," "abandoned," or "no intention" as the prediction of the usage result. The execution module 103 is only required to execute the processing corresponding to the output label. For example, the execution module 103 may confer a coupon when "abandoned" is output. Moreover, for example, the execution module 103 may confer a coupon when there has been a change from "conversion" to "abandoned" or "no intention."

[3-2. Functions to be Implemented in Learning Server]

As illustrated in FIG. 6, in the learning server 20, a data storage module 200, a learning module 201, an acquisition module 202, and a prediction module 203 are implemented. The data storage module 200 is mainly implemented by the storage 12, and each of the other functions is mainly implemented by the controller 21.

[Data Storage Module]

The data storage module 200 is configured to store the data required for analyzing the actions of the user. For example, the data storage module 200 stores the action history database DB2, the domain knowledge database DB3, and a teacher data set DSn. The "n" in the "teacher data set DSn" has the same meaning as the "n" in the "learning model Mn."

FIG. 8 is a table for showing a data storage example of the action history database DB2. As shown in FIG. 8, the action history database DB2 includes data showing the action history of each of a plurality of users who used the service in the past. The action history database DB2 may store the action histories for all past periods, or may store the action histories for a part of those periods. Further, the action history database DB2 may store the action histories of all the users, or may store only the action histories of a part of the users.

For example, the action history database DB2 stores an action history ID for uniquely identifying the action history, a user ID, the content of the action history, and a label indicating the usage result of the service included in the action history. The timing at which the label is determined is the time when the action indicated by the action history is performed. The action histories stored in the action history database DB2 are action histories from disconnected sessions.

For example, when the web server 10 disconnects the session with the user terminal 30 of a certain user, the web server 10 refers to the user database DB1, and acquires the action history during the session associated with the user ID of the user. The web server 10 transmits to the learning server 20 the user ID of the user and the acquired action history during the session. The learning server 20 receives the user ID and the action history, issues an action history ID, and stores the user ID, the action history, and the action history ID in the action history database DB2.

The learning server 20 assigns a label to the stored action history based on the domain knowledge database DB3 described later. The label is the usage result obtained as a result of the action indicated by the action history. As described above, in this embodiment, there are three types of labels, namely, "conversion," "abandoned," and "no intention." Each action history belongs to any one of those three types. The method of assigning the label is described later. The label may also be manually assigned by a service administrator, for example.

FIG. 9 is a table for showing a data storage example of the domain knowledge database DB3. As shown in FIG. 9, the domain knowledge database DB3 is configured to store various types of information on the service provided by the web server 10. For example, the domain knowledge database DB3 stores an attribute of each of a plurality of pages.

The attribute is the type of the page. In this embodiment, the attribute is used to assign the label indicating the usage result of the service. For example, the attribute is information indicating a hierarchy of the page. To the pages at a higher hierarchy level, for example, the top page A, the search page B, the search result page C, and the details page D, a "no intention" attribute is assigned. Further, for example, to the pages at an intermediate hierarchy level, for example, the reservation step 1 page E and the reservation step 2 page F, a "has intention" attribute is assigned. Moreover, for example, to the pages at a lower hierarchy level, for example, the reservation completion page G, a "conversion" attribute is assigned.

In this embodiment, when only pages having the "no intention" attribute have been displayed, the label "no intention" is assigned. When a page having a "has intention" attribute has been displayed but a page having the "conversion" attribute has not been displayed, the label "abandoned" is assigned. When a page having the "conversion" attribute has been displayed, the label "conversion" is assigned. The processing of assigning those labels may be executed by the learning server 20 or by another computer. The assigned label is stored in the action history database DB2.

FIG. 10 is a table for showing a data storage example of the teacher data set DSn. As shown in FIG. 10, a large number of pieces of teacher data, which are pairs of inputs and outputs to be learned by the learning model Mn, are stored in the teacher data set DSn. For example, a pair of a feature amount of the action history and the label assigned to the action history is stored in each piece of teacher data.

The teacher data is the data to be learned by the learning model Mn. The term "teacher data" is also referred to as "learning data" or "training data." For example, the teacher data is a pair of an input (question) to the learning model Mn and an output (answer) from the learning model Mn. As another example, the teacher data is a data pair of data having the same format as that of input data (unknown classification target) input to a learning model (labeled classification target) and the label assigned to the data.

In machine learning, training is performed by using a plurality of pieces of teacher data. Therefore, in this embodiment, a collection of a plurality of pieces of teacher data is referred to as "teacher data set DSn," and the individual pieces of data included in the teacher data set DSn are referred to as "teacher data." That is, the term "teacher data" as used herein refers to the above-mentioned pairs, and the term "teacher data set DSn" refers to a collection of those pairs.

The feature amount is a numerical value indicating a feature of the action history. In this embodiment, there is described a case in which the feature amount is represented by a multidimensional vector, but the feature amount can be represented in any form. For example, the feature amount may be represented by an array, or may be represented by one numerical value. The feature amount can be calculated by any calculation formula. For example, the feature amount is calculated by quantifying the feature by a predetermined calculation formula. The feature amount may be calculated by the learning model Mn. In this case, the content of the action history itself is stored as the input in the teacher data.

In this embodiment, a teacher data set DSn is prepared for each learning model Mn. Therefore, the number of teacher data sets DSn is equal to the number of learning models Mn. That is, the learning models Mn and the teacher data sets DSn have a one-to-one correspondence. For example, a teacher data set DS1 is used in order to train the learning model M1.

For example, the teacher data set DS1 shows the relationship between the first action in the action history of a user who used the service in the past and the usage result of the service included in the action history. Further, for example, a teacher data set DS2 shows the relationship between the actions up to the second action in the action history of a user who used the service in the past and the usage result of the service included in the action history. The same applies to the other teacher data sets DSp, which show the relationship between the actions up to the p-th action in the action history of a user who used the service in the past and the usage result of the service included in the action history.

The data stored in the data storage module 200 is not limited to the example described above. For example, the data storage module 200 stores the programs and parameters of a learned learning model Mn in addition to the data described above. The learning processing of the learning model Mn is executed by the learning module 201.

[Learning Module]

The learning module 201 is configured to execute learning processing for the learning model Mn based on the teacher data set DSn. In this embodiment, the service is used by browsing the pages for reserving a facility or purchasing a product, and therefore the learning model Mn learns a relationship between the browsing history of each user in the past and the result regarding whether or not the service was converted.

A known method used in machine learning can be used for the learning processing itself. For example, learning processing used in a neural network can be used. It is assumed that the learning processing program is stored in the data storage module 200. The learning module 201 adjusts the parameters of the learning model Mn such that the relationship between the inputs and the outputs in the teacher data stored in the teacher data set DSn can be obtained.

The service in this embodiment is used by sequentially performing each of a plurality of steps. Therefore, the learning model Mn learns a relationship between an action history showing at least one step performed by each user in the past and the usage result included in the action history.

A step is a procedure performed when the service is used. For example, in each step, a page for using the service is displayed, and the learning models Mn are prepared in the order in which the pages are displayed. Therefore, in this embodiment "the display of each page" can be read as "step." The order in which the pages are displayed is the number of the symbol "n" in "Mn." This order can also be referred to as "page browsing order."

The steps are not limited to the display of each page, and may be any type of step. For example, the display of a plurality of pages may correspond to one step. Further, for example, input to individual input forms may correspond to one step. The step may be any unit including at least one action.

For example, a learning model Mn is prepared for each step, and the learning module 201 causes each learning model Mn to learn a relationship between an action history showing that a corresponding step has been progressed to and the usage result included in the action history. Action histories showing that the corresponding step has not been progressed to are not learned by the learning model Mn. The method of creating the teacher data set DSn to be learned by each learning model Mn is described with reference to model creation processing (FIG. 12) described later.

As described above, any model, for example, a neural network, can be applied as the learning model Mn, and the learning model Mn may use a weighted k-nearest neighbor algorithm. In this case, the learning model Mn classifies the action history of a user using the service based on the weighted k-nearest neighbor algorithm, and outputs a usage result.

Figure 11:
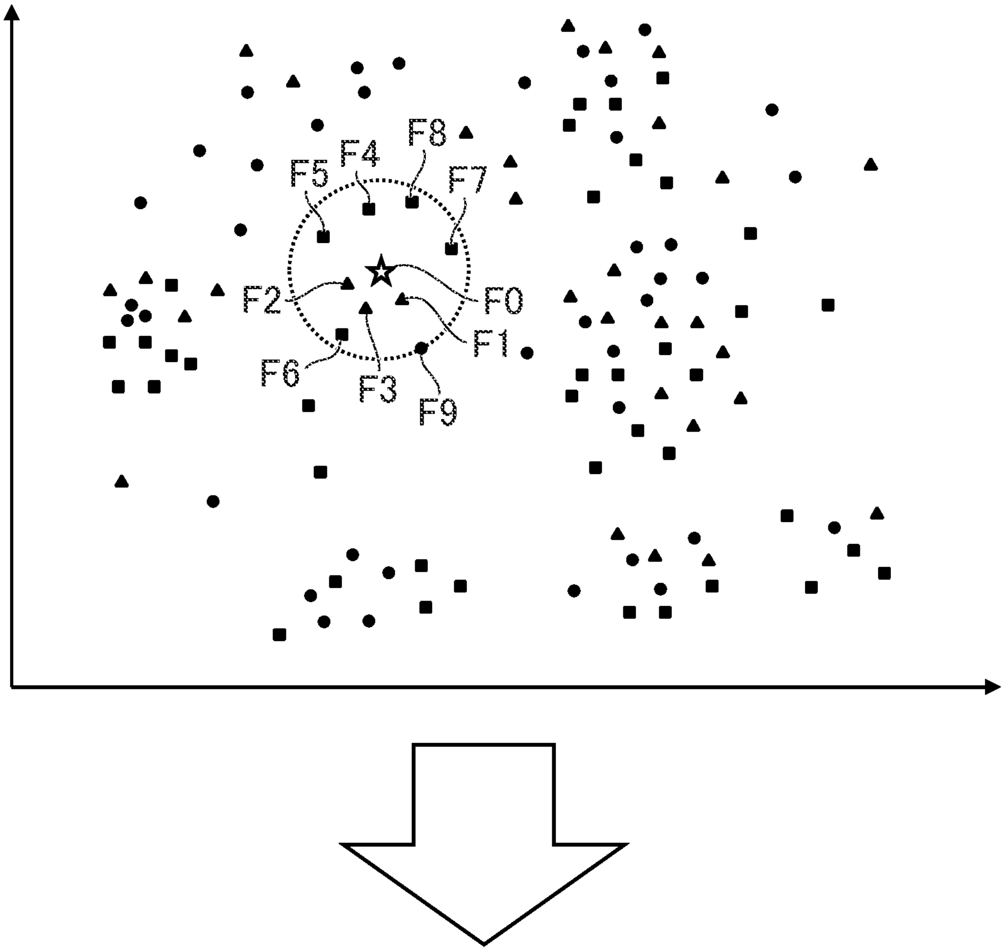
FIG. 11 shows a graph and tables for showing an example of a learning model using a weighted k-nearest neighbor algorithm.

FIG. 11 shows a graph and tables for showing an example of a learning model Mn using the weighted k-nearest neighbor algorithm. In the example of FIG. 11, there is shown a case in which the feature amounts of action histories are plotted on a two-dimensional plane, and a feature amount FO of the action history to be classified is indicated by a star shape. The learning model Mn acquires feature amounts F1 to F9 of k action histories (labeled action histories) in ascending order of a distance from the feature amount FO of the action history to be classified.

In the example of FIG. 11, the feature amounts F1 to F3 of the three action histories to which the label "conversion" has been assigned, the feature amounts F4 to F8 of the five action histories to which the label "abandoned" has been assigned, and the feature amount F9 of the one action history to which the label "no intention" has been assigned are acquired. The learning model Mn determines a weighting coefficient in accordance with a distance between the feature amount FO of the action history to be classified and each of the acquired feature amounts F1 to F9 of the labeled action histories. For example, as those distances become shorter, the weighting coefficients become higher. The relationship between the distance and the weighting coefficient may be determined in advance. For example, the weighting coefficient is inversely proportional to the distance.

In the case of an unweighted k-nearest neighbor algorithm, the label is determined by a majority vote. Therefore, in the above-mentioned case, "abandoned," which has five votes, is assigned to the action history to be classified. Meanwhile, as shown in FIG. 11, in the weighted k-nearest neighbor algorithm, the voting result changes depending on the weighting coefficient, and "conversion" is assigned to the action history to be classified. Various methods can be applied as the weighting method itself. For example, the distance and the weighting coefficient are not required to be in a simple inverse proportion, and may have an exponential relationship.

[Acquisition Module]

The acquisition module 202 is configured to acquire the action history of a user using the service. In this embodiment, the action history of a user using the service is stored in the user database DB1, and the acquisition module 202 is implemented by the learning server 20. Therefore, the acquisition module 202 acquires, from the web server 10, the action history of a user using the service stored in the user database DB1. When there are a plurality of users using the service, the acquisition module 202 acquires the action history of each user using the service.

In this embodiment, each of a plurality of steps is sequentially performed, and therefore the acquisition module 202 acquires at least one step performed by a user using the service as the action history of the user using the service. In this embodiment, the action history of the user using the service is updated repeatedly, and therefore the acquisition module 202 acquires the latest action history of the user using the service. For example, the acquisition module 202 acquires the latest action history each time a new page is displayed. Further, in this embodiment, the action history includes the browsing history of the page, and therefore the acquisition module 202 acquires the browsing history of the user using the service. The action history may also include the input history, but is not particularly required to include the input history. In this case, the action history shows only the browsing history.

[Prediction Module]

The prediction module 203 is configured to predict the usage result of the user using the service based on the action history of the user using the service and the learning model Mn. For example, the prediction module 203 calculates the feature amount of the action history of the user using the service and inputs the calculated feature amount to the learning model Mn. The learning model Mn outputs the probability of each label as the usage result based on the input feature amount.

In this embodiment, a learning model Mn is prepared for each step, and therefore the prediction module 203 selects, from among the plurality of learning models Mn, the learning model Mn corresponding to the step currently being performed by the user using the service, and predicts the usage result based on the selected learning model Mn. For example, the prediction module 203 selects, from among the plurality of learning models Mn, the learning model Mn corresponding to the order of the page currently displayed by the user using the service. It is assumed that the correspondence relationship between the current order and the learning model Mn to be selected is defined in the data storage module 200 in advance.

The prediction module 203 predicts, when the latest action history of the user using the service is acquired, the latest usage result of the user using the service. For example, the prediction module 203 predicts the usage result of the user using the service each time the action history of the user using the service is updated. In this embodiment, the presence or absence of conversion is acquired as the usage result, and therefore the prediction module 203 predicts whether or not the service is to be converted by the user using the service based on the browsing history of the user using the service and the learning model Mn.

4. Processing to be Executed in this Embodiment

Next, the processing to be executed in the prediction system S is described. In this embodiment, there are described model creation processing of creating a learning model Mn and service provision processing of providing a service to a user.

[4-1. Model Creation Processing]

Figure 12:
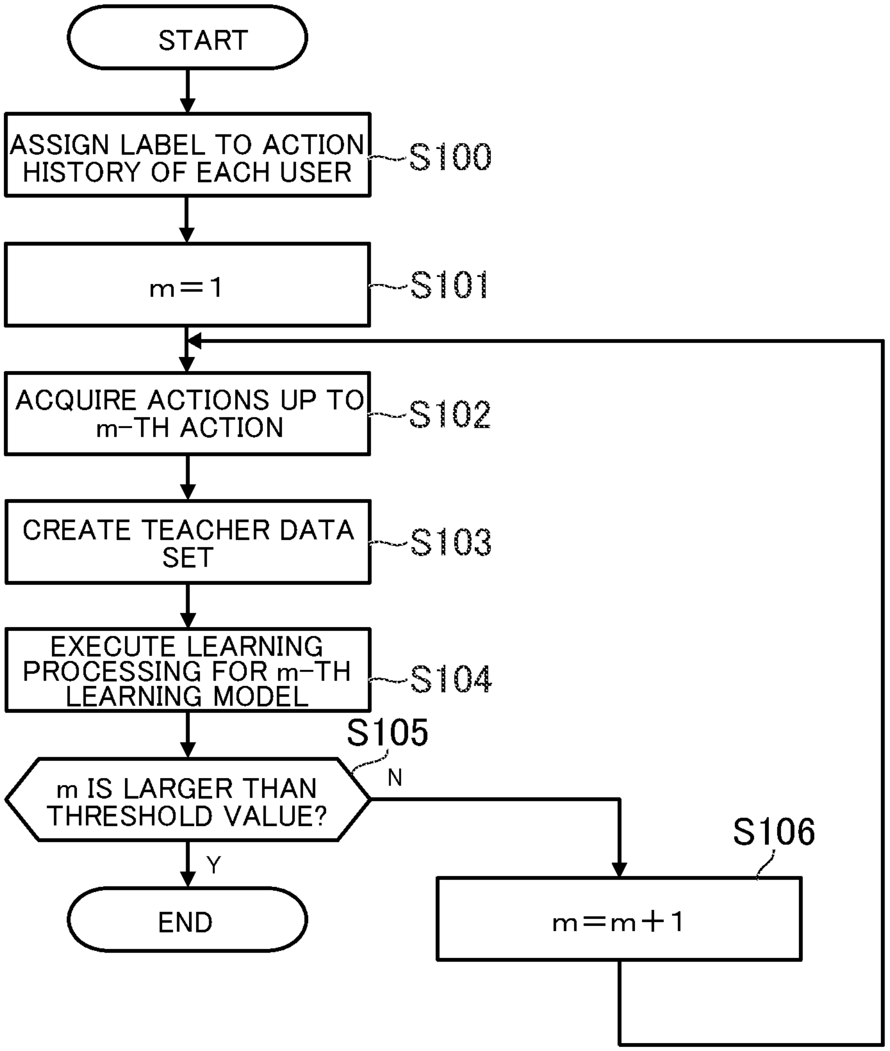
FIG. 12 is a flowchart for illustrating an example of model creation processing.

FIG. 12 is a flowchart for illustrating an example of model creation processing. The processing illustrated in FIG. 12 is executed by the controller 21 operating based on programs stored in the storage 22. The model creation processing is an example of the processing of the functional blocks illustrated in FIG. 6.

As illustrated in FIG. 12, the learning server 20 assigns a label to the action history of each user based on the action history database DB2 and the domain knowledge database DB3 (Step S100). In Step S100, the learning server 20 assigns a label to each action history stored in the action history database DB2. The method of assigning the label is as described above.

The learning server 20 substitutes 1 for a counter variable "m" (Step S101). The learning server 20 acquires, from each action history stored in the action history database DB2, the actions up to the m-th action (Step S102). For example, when "m" is 1, the learning server 20 acquires, of the actions shown in each action history, only the first action. When "m" is 2 or more, the learning server 20 acquires, of the actions shown in each action history, the actions up to the m-th action. When "m" is 2 or more, the learning server 20 does not acquire actions from action histories in which only actions up to the (m−1)th action exist.

The learning server 20 creates a teacher data set DSm based on the action histories acquired in Step S102 and the labels assigned in Step S100 (Step S103). In Step S103, the learning server 20 creates, for each action history, a pair in which the feature amount up to the m-th action history is an input and the label of the action history is an output. The learning server 20 creates the teacher data set DSm in which the pair of each action history is stored. It is assumed that an algorithm for calculating the feature amount is stored in the learning server 20 in advance. The calculation algorithm is defined so as to convert a value included in the action history to a multidimensional vector when the value is input.

The learning server 20 executes the learning processing for the m-th learning model Mm based on the teacher data set DSm created in Step S103 (Step S104). In Step S104, the parameters of the learning model Mm are adjusted so that the input-output relationships of a large number of pairs stored in the teacher data set DSm can be obtained.

The learning server 20 determines whether or not the counter variable "m" is larger than a threshold value (Step S105). The threshold value is the maximum value of "n." When it is not determined that the counter variable "m" is larger than the threshold value (Step S105: N), the learning server 20 increments the counter variable "m" (Step S106), and returns the processing to Step S102. In this case, a teacher data set DSm for the next learning model Mm is created and learning processing is executed. Meanwhile, when it is determined that the counter variable "m" is larger than the threshold value (Step S105: Y), the processing ends.

[4-2. Service Provision Processing]

Figure 13:
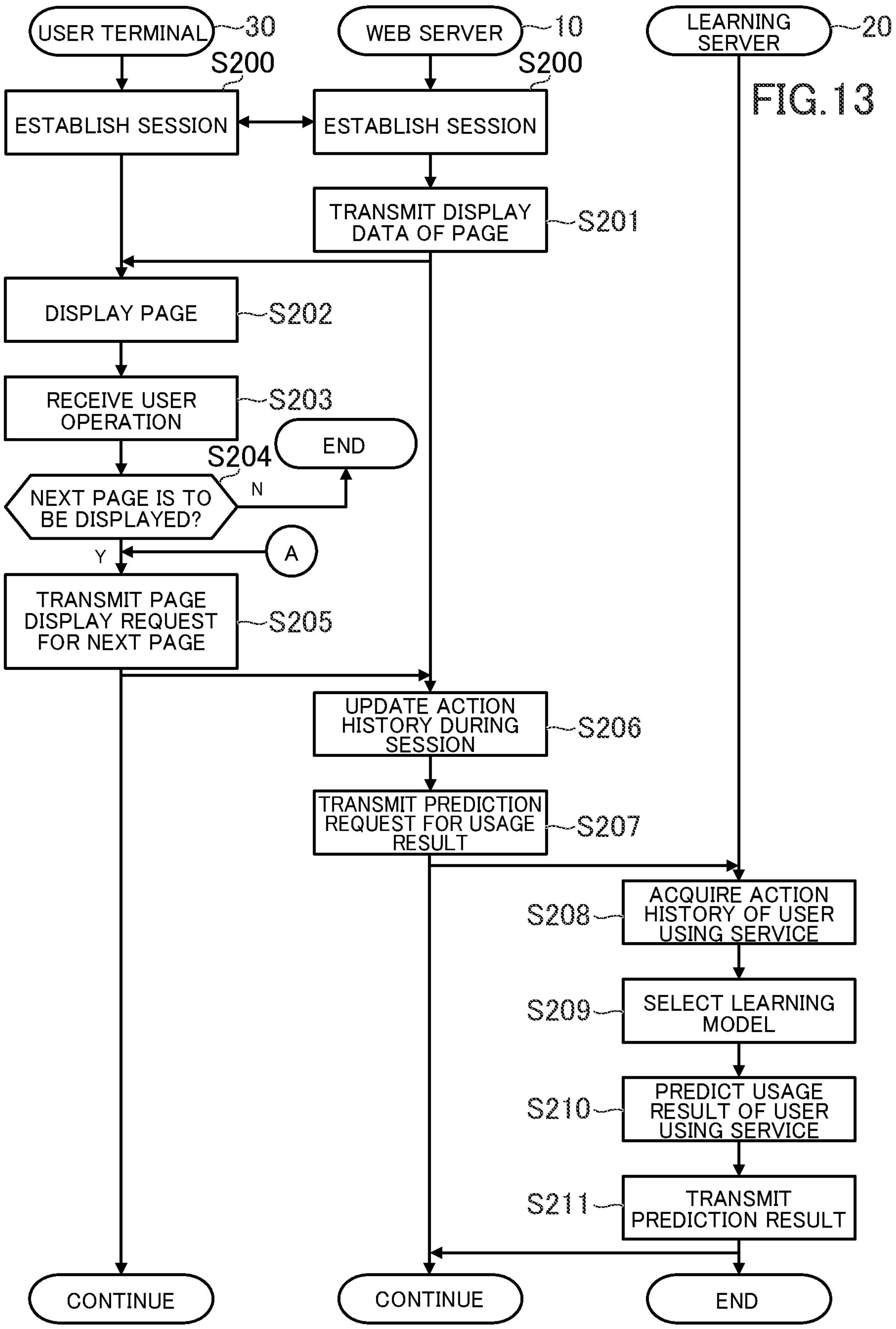
FIG. 13 is a flowchart for illustrating an example of service provision processing.
Figure 14:
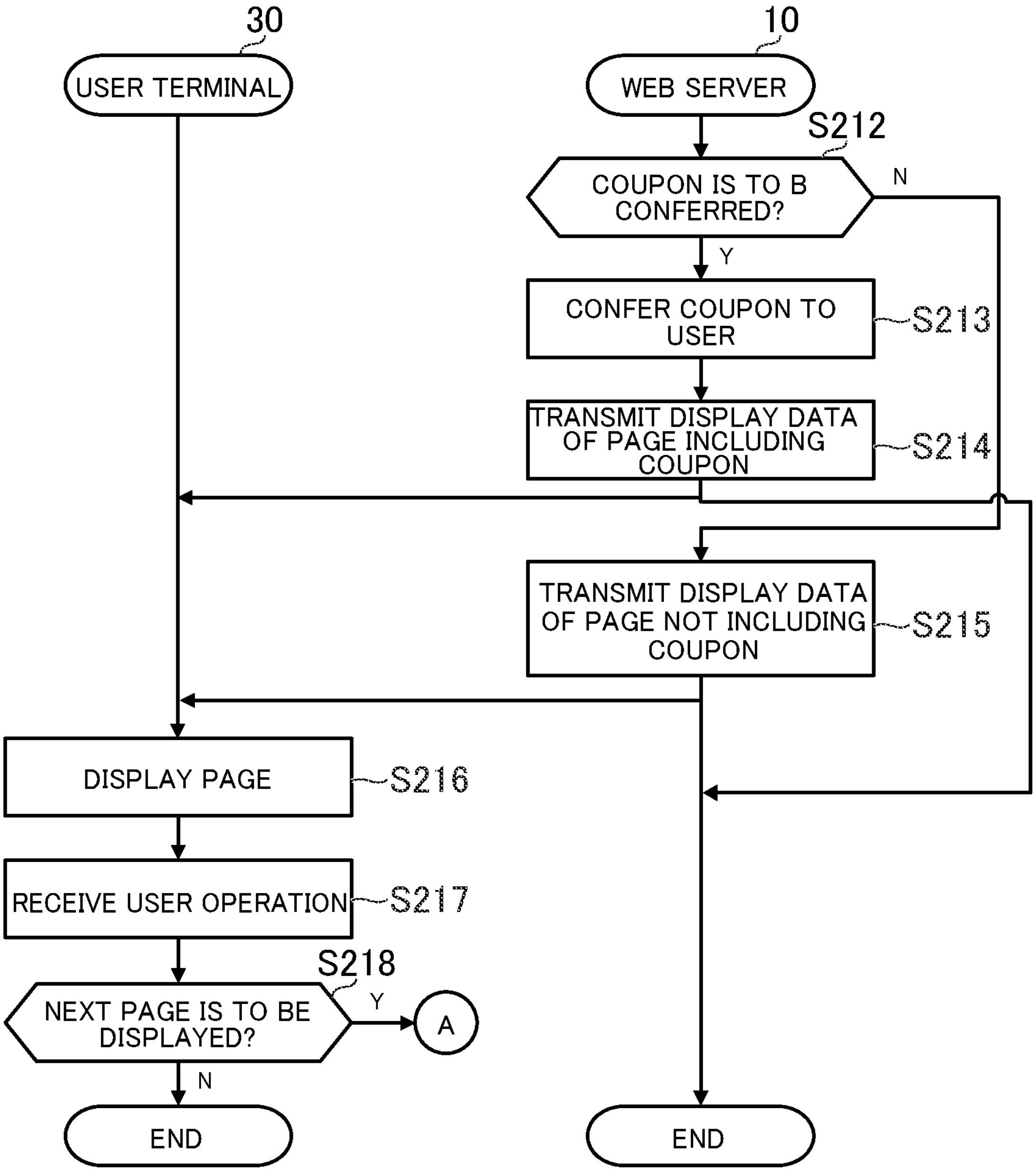
FIG. 14 is a flowchart for illustrating an example of the service provision processing.

FIG. 13 and FIG. 14 are flowcharts for illustrating an example of service provision processing. The processing illustrated in FIG. 13 and FIG. 14 is executed by each of the controllers 11, 21, and 31 operating based on programs stored in the storages 12, 22, and 32, respectively. The service provision processing is an example of the processing of the functional blocks illustrated in FIG. 6.

As illustrated in FIG. 13, when the user terminal 30 transmits an access request to the web server 10, a session is established between the web server 10 and the user terminal 30 (Step S200). In Step S200, the session is established in accordance with a procedure defined by a predetermined communication protocol. When a session is established, the web server 10 stores the session ID and the session start time in association with the user ID of the user who accessed the web server 10. The session ID is issued so as not to duplicate another session. As the session start time, the current date and time acquired by using a real-time clock, for example, may be stored.

In this embodiment, the user ID and password are transmitted and authentication processing is executed when the session is established, but authentication processing is not required to be executed. In this case, it may not be possible to identify the user ID of the user accessing the service, and therefore the web server 10 may record the session ID and the session start time in a location different from the user database DB1.

The web server 10 transmits to the user terminal 30 the display data of the page having the URL specified by the user (Step S201). In this embodiment, it is assumed that the URL is included in the access request. Therefore, at the time point when the session has just been established, in Step S201, the web server 10 transmits the display data of the page having the URL included in the access request.

The user terminal 30 receives the display data, displays the page on the display 35 (Step S202), and receives a user operation based on a detection signal of the operation interface 34 (Step S203). In Step S203, the user terminal 30 receives an operation, for example, focusing on an input form, inputting information to an input form, scrolling a page, or selecting a button. A known method can be used as the method of detecting the operation. For example, an event detection function installed as standard in the OS may be used. The user terminal 30 records the input history of the user on the displayed page in the storage 22 in time series.

The user terminal 30 determines whether or not an operation for displaying the next page has been performed (Step S204). For example, a button including a link to another page is displayed on the displayed page. The operation received in Step S204 is the operation of selecting the link. When it is not determined that the operation has been performed (Step S204: N), the processing ends.

Meanwhile, when it is determined that the operation for displaying the next page has been performed (Step S204: Y), the user terminal 30 transmits a page display request for the next page to the web server 10 (Step S205). It is assumed that the page display request includes the URL of the next page and the operation content received in Step S203 and Step S204. The session is forcibly disconnected after a certain period of time has elapsed without transmission of the page display request for the next page.

The web server 10 receives the page display request, and updates the action history during the session stored in the user database DB1 (Step S206). In Step S206, the web server 10 stores the URL of the page displayed on the user terminal 30 and the operation content included in the page display request in association with the user ID of the user using the service.

The web server 10 transmits to the learning server 20 a prediction request for the usage result of the service (Step S207). It is assumed that the prediction request includes the action history up to the present time of the user using the service.

The learning server 20 receives the prediction request, acquires the action history of the user using the service included in the prediction request (Step S208), and selects the learning model Mn to be used (Step S209). In Step S209, the learning server 20 identifies up to what page is shown by the action history acquired in Step S208. When the page is the p-th page, the learning server 20 selects the learning model Mp.

The learning server 20 predicts the usage result of the user using the service based on the action history acquired in Step S208 and the learning model Mn selected in Step S209 (Step S210), and transmits the prediction result obtained in Step S210 to the web server 10 (Step S211). In Step S209, the learning server 20 calculates the feature amount of the action history acquired in Step S208. The learning server 20 inputs the calculated feature amount into the learning model Mn. The learning model Mn calculates and outputs the probability of each label based on the input feature amount. The learning server 20 acquires the probability of each label output from the learning model Mn as the prediction of the usage result.

Referring next to FIG. 14, the web server 10 receives the prediction result, and determines whether or not to confer a coupon (Step S212). In Step S212, the web server 10 stores the received prediction result in the user database DB1. The web server 10 determines, based on the prediction result history, whether or not the probability of "abandoned" has increased. The web server 10 determines that a coupon is to be conferred when the probability has increased.

When it is determined that a coupon is to be conferred (Step S212: Y), the web server 10 confers the coupon to the user using the service (Step S213), and transmits display data of a page including the coupon to the user terminal 30 (Step S214). In Step S214, the web server 10 stores coupon information in association with the user ID of the user using the service. An image showing the coupon is displayed on the page including the coupon. The user can use the coupon by selecting the image.

Meanwhile, in Step S212, when it is not determined that a coupon is to be conferred (Step S212: N), the web server 10 transmits display data of a page not including the coupon to the user terminal 30 (Step S215).

The user terminal 30 receives the display data, and displays the page on the display 35 based on the display data (Step S216). The subsequent processing of Step S217 and Step S218 is the same as that of Step S203 and Step S204, respectively. When it is not determined that the operation for displaying the next page has been performed (Step S218: N), the processing ends. Meanwhile, when it is determined that the operation has been performed (Step S218: Y), the processing returns to Step S205, and the processing described above is repeated. The prediction system may be configured to avoid conferring a coupon to a user who has already received a coupon once, or a different coupon may be conferred regardless of whether or not the user has already received a coupon.

The web server 10 determines whether or not the session has been disconnected. A known method can be applied as the method of determining session disconnection, and the determination may be performed in accordance with the procedure specified by the communication protocol. When it is not determined that the session has been disconnected, the processing of Step S206 is again executed when a page display request is received from the user terminal 30. Meanwhile, when it is determined that the session has been disconnected, the processing ends.

According to the prediction system S described above, the prediction accuracy of a usage result and the real-time performance of the corresponding processing can be increased by predicting the usage result of a user using a service based on the action history of the user using the service and a learning model Mn, and executing the processing corresponding to the predicted usage result. For example, when the prediction system S detects that the user is to "abandon" the service, that is, the user is likely to leave the service, the prediction system S can confer a privilege, for example, a coupon, at an appropriate timing to increase the conversion rate. Through conferring a privilege, for example, a coupon, at an appropriate timing, the cost of conferring the privilege can be reduced. For example, when a privilege, for example, a coupon, is conferred to all users, the processing load on the web server 10 is increased by the amount of processing required to confer the privilege to all the users, but by conferring the privilege to an appropriate user at an appropriate timing, the processing load on the web server 10 can be reduced.

Further, through acquiring at least one step performed by a user using a service as an action history of the user using the service and predicting the usage result, the prediction system S can increase the prediction accuracy and the real-time performance in a service in which each of a plurality of steps is sequentially performed. For example, through predicting the usage result of a user each time the user using the service performs an individual step, the prediction accuracy can be increased, and the real-time performance can be increased by executing the processing corresponding to the prediction result for each step.

Further, through selecting the learning model Mn corresponding to the step currently being performed by the user using the service from among a plurality of learning models Mn, the prediction system S can use the optimum learning model Mn corresponding to the current step to predict the usage result and effectively increase the prediction accuracy of the usage result.

Further, through causing each learning model Mn to learn a relationship between an action history showing that a corresponding step has been progressed to and the usage result included in the action history, the prediction system S can prevent information that is not required from being learned, to thereby increase the accuracy of the learning models Mn. Moreover, unrequired information is not used in the learning processing, and therefore the learning processing can be speeded up.

Further, through preparing the learning models Mn in the order in which the pages are displayed and selecting the learning model Mn corresponding to the order of the page currently displayed by the user using the service from among the plurality of learning models Mn, the prediction system S can cause the optima learning model Mn corresponding to the current order to predict the usage result, to thereby effectively increase the prediction accuracy of the usage result.

Further, through predicting the latest usage result of the user using the service when the latest action history of the user using the service is acquired, and executing processing, for example, conferring a coupon, when the predicted latest usage result has changed from the usage result predicted in the past, the prediction system S can execute the processing at the optimum timing. For example, even when the probability of the predicted usage result changes dramatically, the processing corresponding to the latest prediction result can be executed quickly.

Further, through executing the processing corresponding to the probability of the predicted usage result, the prediction system S can execute the processing at the optimum timing. For example, even when the probability of the predicted usage result changes dramatically, the processing corresponding to the latest prediction result can be executed quickly.

Further, through classifying the action history of a user using the service based on a weighted k-nearest neighbor algorithm and using the learning model Mn outputting the usage result, the prediction system S can effectively increase the prediction accuracy. Moreover, through using the k-nearest neighbor algorithm, which has relatively simple processing, the processing of predicting the usage result can be speeded up. As a result, the real-time performance of the prediction system S can be effectively increased.

Further, through predicting whether or not the service is to be converted by the user using the service based on the browsing history of the user using the service and the learning model Mn, and executing the processing corresponding to the predicted presence or absence of conversion, the prediction system S can increase the prediction accuracy and real-time performance of the service to be used by browsing pages for reserving a facility or purchasing a product.

Further, as the processing, through conferring a coupon relating to the service to the user using the service when it is predicted that the service is not to be converted by the user using the service, the prediction system S can prevent the user from leaving, to thereby increase the conversion rate.

5. Modification Examples

The present disclosure is not limited to the embodiment described above, and can be modified suitably without departing from the spirit of the present disclosure.

For example, there has been described a service using a website as an example, but the prediction system S can also be applied to a situation in which user actions in an actual shop are analyzed. In this case, the learning model Mn learns a relationship between the action history of the user in the actual shop and the usage result of the service included in the action history. The action history includes, for example, movement in the shop, movement of hands and feet, an orientation of the face, and a posture of the user. At least one camera is installed in the actual shop, and the prediction system S identifies the actions of the user by using image analysis. The prediction system S inputs the action history of the user obtained by image analysis into the learning model Mn at regular intervals, and acquires the usage result of the service. For example, the prediction system S executes predetermined processing when the usage result of the service indicates "abandoned" (going out of the actual shop). The processing may be any processing of increasing the interest of the user. For example, the processing may be outputting a predetermined voice from a speaker, transmitting a coupon to a terminal of the user, or issuing a predetermined notification to a shop worker.

Further, for example, in the embodiment, there is described a service to be used by sequentially performing each of a plurality of steps as an example, but it is not required that the steps performed when the service is used be particularly defined. Moreover, for example, the processing to be executed by the execution module 103 is not limited to the processing described in the embodiment. For example, the execution module 103 may display changes (for example, a graph like that shown in FIG. 4 and FIG. 5) in the probability of conversion, for example, on the analyst terminal 40. In addition, for example, there has been described a case in which any of the three types of labels is assigned to each action history. However, the number of labels may be any number, and there may be two types or four or more types. Further, for example, the prediction system S can be applied to situations other than the situation of predicting conversion by the user. For example, the prediction system S may be applied to a situation of user fraud detection, or a situation of detecting a user who does not know how to use the service.

Further, for example, the functions described as being implemented in the web server 10 may be implemented in the learning server 20 or another computer. Moreover, for example, the functions described as being implemented in the learning server 20 may be implemented in the web server 10 or another computer. In addition, for example, there has been described a case in which the various functions are implemented in the web server 10 and the learning server 20, but those functions may be implemented in one computer. For example, each function may be assigned to any one of the web server 10, the user terminal 30, and the analyst terminal 40. In this case, the functions may be assigned by transmitting and receiving processing results via the network N. Further, for example, the data described as being stored in the data storage module 200 may be stored in a computer other than the web server 10.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A prediction system, comprising:

a learning model, in which a relationship between an action history of each of a plurality of users who used a golf course reservation service in the past and a usage result of the golf course reservation service included in the action history of each of the plurality of users, is learned; and at least one processor, the at least one processor being configured to:

acquire the action history of a user using the golf course reservation service, wherein the action history includes a plurality of specific actions associated with a webpage performed by the user, and wherein the plurality of specific actions include bookmarking the webpage and interacting with a specific field of one or more fields contained on the webpage, wherein the action history further includes a history of webpages visited, wherein each of the webpages is assigned an attribute, wherein the attributes include conversion or no intention;

predict the usage result of the user using the golf course reservation service based on the action history of the user using the golf course reservation service and the learning model, wherein the learning model is configured to classify, based on a weighted k-nearest neighbor algorithm, the action history of the user using the golf course reservation service, and to output the usage result, wherein the usage result is a predicted status of a golf course reservation, wherein the predicted status is determined by calculating a probability of conversion, no intention, and abandoned;

acquire a latest action history of the user using the golf course reservation service;

rank a plurality of coupons based on a probability associated with each coupon of the plurality of coupons;

predict, when the latest action history of the user using the golf course reservation service has been acquired, the latest usage result of the user using the golf course reservation service;

select, based on the ranking of the plurality of coupons and based on a difference in probability between the usage result and the latest usage result being greater than a threshold, a coupon from the plurality of coupons;

execute processing corresponding to the usage result predicted, wherein executing the processing includes outputting the selected coupon, wherein the selected coupon is output when there has been a change from a state in which the predicted status is conversion to a state in which the predicted status is abandoned, wherein the golf course reservation service comprises a plurality of steps, wherein the learning model comprises a plurality of sub-models, and wherein the at least one processor is further configured to:

display a page from a plurality of pages for using the golf course reservation service at each step, wherein the plurality of sub-models are ordered in an order in which the pages are displayed, and select, from among the plurality of sub-models, a sub-model corresponding to the order of the page currently displayed by the user using the golf course reservation service; and predict the usage result based on the selected sub-model.

2. The prediction system according to claim 1, wherein the learning model has learned therein a relationship between the action history showing at least one step performed by each user in the past and the usage result included in the action history, and wherein the at least one processor is configured to acquire the at least one step performed by the user using the golf course reservation service as the action history of the user using the golf course reservation service; and executing a golf course reservation associated with the selected coupon based on the user performing a predetermined reservation operation.

3. The prediction system according to claim 2, wherein the at least one processor is configured to cause each of the plurality of sub-models to learn a relationship between an action history showing that a corresponding step has been progressed to and the usage result included in the action history.

4. The prediction system according to claim 1, wherein the learning model is configured to output a probability of the usage result, and wherein the at least one processor is configured to execute the processing corresponding to the probability of the usage result predicted.

5. The prediction system according to claim 1, wherein the golf course reservation service is used by browsing pages for one of a reservation of a facility and purchase of a product, wherein the learning model is configured to learn a relationship between a browsing history of each user in the past and a result of whether the golf course reservation service has been converted, and wherein the at least one processor is configured to:

acquire the browsing history of the user using the golf course reservation service;

predict, based on the browsing history of the user using the golf course reservation service and the learning model, whether the golf course reservation service is to be converted by the user using the golf course reservation service; and execute the processing corresponding to the predicted presence or absence of conversion.

6. The prediction system according to claim 5, wherein the at least one processor is configured to confer, as the processing, to the user using the golf course reservation service, one of a coupon and points relating to the golf course reservation service when it is predicted that the golf course reservation service is not to be converted by the user using the golf course reservation service.

7. A prediction method executed by at least one processor, comprising:

acquiring an action history of a user using a golf course reservation service, wherein the action history includes a plurality of specific actions associated with a webpage performed by the user, and wherein the plurality of specific actions include bookmarking the webpage and interacting with a specific field of one or more fields contained on the webpage, wherein the action history further includes a history of webpages visited, wherein each of the webpages visited are assigned an attribute, wherein the attributes include conversion or no intention;

calculating a predicted usage result of the user using the golf course reservation service based on the action history of the user using the golf course reservation service and a learning model in which a relationship between an action history of each of a plurality of users who used the golf course reservation service in the past and an observed usage result of the golf course reservation service included in the action history of each of the plurality of users is learned, wherein the learning model is configured to classify, based on a weighted k-nearest neighbor algorithm, the action history of the user using the golf course reservation service, and to output the usage result, wherein the usage result is a predicted status of a golf course reservation, wherein the predicted status is determined by calculating a probability of conversion, no intention, and abandoned;

acquiring a latest action history of the user using the golf course reservation service;

ranking a plurality of coupons based on a probability associated with each coupon of the plurality of coupons;

predicting, when the latest action history of the user using the golf course reservation service has been acquired, the latest usage result of the user using the golf course reservation service;

selecting, based on the ranking of the plurality of coupons and based on a difference in probability between the usage result and the latest usage result being greater than a threshold, a coupon from the plurality of coupons;

executing processing corresponding to the predicted usage result predicted, wherein executing the processing includes outputting the selected coupon; and executing a golf course reservation associated with the selected coupon based on the user performing a predetermined reservation operation, wherein the selected coupon is output when there has been a change from a state in which the predicted status is conversion to a state in which the predicted status is abandoned, wherein the golf course reservation service comprises a plurality of steps, wherein the learning model comprises a plurality of sub-models, and wherein the method further comprises:

displaying a page from a plurality of pages for using the golf course reservation service at each step, wherein the plurality of sub-models are ordered in an order in which the pages are displayed, and selecting, from among the plurality of sub-models, a sub-model corresponding to the order of the page currently displayed by the user using the golf course reservation service; and predicting the usage result based on the selected sub-model.

8. A non-transitory information storage medium having stored thereon a program for causing a computer to:

acquire an action history of a user using a golf course reservation service, wherein the action history includes a plurality of specific actions associated with a webpage performed by the user, and wherein the plurality of specific actions include bookmarking the webpage and interacting with a specific field of one or more fields contained on the webpage, wherein the action history further includes a history of webpages visited, wherein each of the webpages is assigned an attribute, wherein the attributes include conversion or no intention;

predict a usage result of the user using the golf course reservation service based on the action history of the user using the golf course reservation service and a learning model in which a relationship between an action history of each of a plurality of users who used the golf course reservation service in the past and a usage result of the golf course reservation service included in the action history of each of the plurality of users is learned, wherein the learning model is configured to classify, based on a weighted k-nearest neighbor algorithm, the action history of the user using the golf course reservation service, and to output the usage result, wherein the usage result is a predicted status of a golf course reservation, wherein the predicted status is determined by calculating a probability of conversion, no intention, or abandoned;

acquire a latest action history of the user using the golf course reservation service;

rank a plurality of coupons based on a probability associated with each coupon of the plurality of coupons;

predict, when the latest action history of the user using the golf course reservation service has been acquired, the latest usage result of the user using the golf course reservation service;

select, based on the ranking of the plurality of coupons and based on a difference in probability between the usage result and the latest usage result being greater than a threshold, a coupon from the plurality of coupons;

execute processing corresponding to the usage result predicted, wherein executing the processing includes outputting the selected coupon; and executing a golf course reservation associated with the selected coupon based on the user performing a predetermined reservation operation, wherein the selected coupon is output when there has been a change from a state in which the predicted status is conversion to a state in which the predicted status is abandoned, wherein the golf course reservation service comprises a plurality of steps, wherein the learning model comprises a plurality of sub-models, and wherein the program further causes the computer to:

display a page from a plurality of pages for using the golf course reservation service at each step, wherein the plurality of sub-models are ordered in an order in which the pages are displayed, and select, from among the plurality of sub-models, a sub-model corresponding to the order of the page currently displayed by the user using the golf course reservation service; and predict the usage result based on the selected sub-model.

* * * * *